United States Patent
Ogawa

(10) Patent No.: US 8,276,204 B2
(45) Date of Patent: Sep. 25, 2012

(54) RELAY DEVICE AND RELAY METHOD

(75) Inventor: Jun Ogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 262 days.

(21) Appl. No.: 12/633,899

(22) Filed: Dec. 9, 2009

(65) Prior Publication Data
US 2010/0088764 A1    Apr. 8, 2010

Related U.S. Application Data

(63) Continuation of application No. PCT/JP2007/063672, filed on Jul. 9, 2007.

(51) Int. Cl.
*H04L 29/06* (2006.01)
*G06F 11/00* (2006.01)
*G06F 12/14* (2006.01)
*G06F 13/00* (2006.01)
*G06F 17/30* (2006.01)
*H04L 9/32* (2006.01)

(52) U.S. Cl. ............ 726/22; 726/13; 713/153; 713/154; 713/166; 713/168

(58) Field of Classification Search .................. None
See application file for complete search history.

(56) References Cited

U.S. PATENT DOCUMENTS

| | | | |
|---|---|---|---|
| 6,768,738 B1 | 7/2004 | Yazaki et al. | |
| 6,772,334 B1* | 8/2004 | Glawitsch | 713/153 |
| 7,360,086 B1* | 4/2008 | Tsuchiya et al. | 713/168 |
| 7,536,548 B1* | 5/2009 | Batke et al. | 713/166 |
| 7,831,822 B2* | 11/2010 | Yoon et al. | 713/154 |
| 2004/0162992 A1* | 8/2004 | Sami et al. | 713/200 |
| 2005/0060582 A1* | 3/2005 | Choi et al. | 713/201 |
| 2006/0253903 A1* | 11/2006 | Krumel | 726/13 |
| 2007/0047548 A1 | 3/2007 | Yazaki et al. | |

FOREIGN PATENT DOCUMENTS

| | | |
|---|---|---|
| JP | 2000-312225 | 11/2000 |
| JP | 2002-158699 | 5/2002 |
| JP | 2002-176454 | 6/2002 |
| JP | 2005-130190 | 5/2005 |
| JP | 2007-60456 | 3/2007 |

OTHER PUBLICATIONS

International Search Report dated Oct. 9, 2007, from the corresponding International Application.

* cited by examiner

*Primary Examiner* — Shin-Hon Chen
(74) *Attorney, Agent, or Firm* — Fujitsu Patent Center

(57) ABSTRACT

An apparatus relays packets transferred over a network and discards an attack packet detected among the packets. The apparatus includes: an inspection-packet outputting unit that outputs, when detecting the attack packet, an inspection packet in which a transmission-source address contained in the attack packet is set as a destination address and a destination address contained in the attack packet is set as a transmission-source address; a filter table storing unit that stores, when acquiring a response packet for the inspection packet, a transmission-source address, a destination address, and identification information of an interface, which has received the response packet, that are contained in the response packet, in a filter table in an associated manner; and a transfer control unit that determines whether to transfer a packet as a transfer object based on the filter table.

6 Claims, 19 Drawing Sheets

FILTER TABLE 103

| TRANSMISSION-SOURCE IP ADDRESS | DESTINATION IP ADDRESS | RECEIVE INTERFACE | PROCESSING | TIME |
|---|---|---|---|---|
| A | B | IF-α | Deny | XX:YY:ZZ |
| A | B | IF-β | Permit | XX:YY:ZZ |
| A | B | IF-γ | Deny | XX:YY:ZZ |
| ⋮ | ⋮ | ⋮ | ⋮ | ⋮ |

FIG.15

FILTER TABLE

| TRANSMISSION-SOURCE IP ADDRESS | DESTINATION IP ADDRESS | RECEIVE INTERFACE | PROCESSING | TIME |
|---|---|---|---|---|
| A | B | IF-$\delta$ | Permit | XX:YY:ZZ |
| A | B | IF-$\varepsilon$ | Deny | XX:YY:ZZ |
| ⋮ | ⋮ | ⋮ | ⋮ | ⋮ |

RELAY DEVICE AND RELAY METHOD

CROSS-REFERENCE TO RELATED APPLICATION(S)

This application is a continuation of International Application No. PCT/JP2007/063672, filed on Jul. 9, 2007, the entire contents of which are incorporated herein by reference.

FIELD

The embodiments discussed herein are directed to an apparatus and a method for relaying packets that are transferred over a network and discarding an attack packet when the attack packet is detected among the packets.

BACKGROUND

In recent years, attack to networks or servers by attack packets has been increasing. Most of the attack packets generally contain forged transmission-source Internet Protocol (IP) addresses to conceal actual transmission sources.

The reason being: firstly, an end user can set an IP address to a terminal; secondly, a communication destination terminal (a server) does not have a scheme for certificating validity of a transmission-source IP address; and thirdly, a relay device (a router) does not have a scheme for recognizing from what interface (IF) the relay device should receive a packet to be relayed, so that the IP address of the communication destination terminal can easily be forged and a source of the attack packet can hardly be traced.

Focusing on the above-mentioned three problems, Japanese Laid-open Patent Publication No. 2002-176454 discloses a conventional technology in which a relay device detects a packet containing a forged transmission-source IP address and discards the detected packet to prevent attack to a network or a server by an attack packet.

The relay device disclosed in Japanese Laid-open Patent Publication No. 2002-176454 utilizes the following fact. That is, a router searches a route table by using a destination IP address of a received packet as a keyword and then relays the packet, i.e., a terminal transmits a packet containing a forged IP address but does not receive a packet addressed to the forged IP address.

The conventional technology (i.e., Japanese Laid-open Patent Publication No. 2002-176454) is described in detail below with reference to FIG. 19. FIG. 19 is a schematic diagram for explaining the conventional technology. In FIG. 19, a terminal 10 is assigned with an IP address A with authorization, and a terminal 20 pretends that it is assigned with the IP address A. Each of the terminals 10 and 20 transmits a packet to a server 50.

Firstly, a router 2 receives not less than a predetermined amount of packets having same transmission-source IP address through a plurality of different interfaces (IF-α and IF-β) (see (1)). Secondly, the router 2 transmits a transmission-source inspection packet in which the IP address A is set as a destination IP address and an IP address of the router 2 is set as a transmission-source IP address (see (2)). As a result, the transmission-source inspection packet is transmitted only to the terminal 10 that is assigned with the IP address A with authorization and is not transmitted to the terminal 20 whose IP address is forged.

Thirdly, the terminal 10 that has received the transmission-source inspection packet returns to the router 2 a response to the transmission-source inspection packet (see (3)). Fourthly, the router 2 sets an entry for a filter so as to permit transmission of only a packet that contains the transmission-source IP address A and is received through an interface that has received the response to the transmission-source inspection packet (IF-α in FIG. 19) and so as to discard other packets that contain the transmission-source IP address A and are received through other interface (IF-β in FIG. 19) (see (4)).

However, in the above-mentioned conventional technology, there has been a problem that an authorized packet whose transmission-source IP address is not forged may be erroneously discarded when a filter is set for a packet.

FIG. 20 is a schematic diagram for explaining the problem with the conventional technology. In FIG. 20, a network has a redundant structure, and the terminal 10 that is assigned with an authorized IP address A communicates with each of the server 50 and a server 60. A packet transmitted from the terminal 10 to the server 50 reaches the server 50 via routers 4, 3, and 1, and a packet transmitted from the terminal 10 to the server 60 reaches the server 60 via the routers 4, 5, and 1, according to a route control in the network.

When a packet is transmitted from the terminal 10 to each of the servers 50 and 60 through the route illustrated in FIG. 20, the router 1 receives packets that have respectively been transmitted from the terminal 10 via two interfaces, i.e., the IF-α and the IF-β.

At this time, assuming that the terminal 20 forges the IP address A and transmits a packet to the server 50, the router 1 sets a filter so that a packet containing the IP address A as a transmission-source IP address is received only through the IF-β according to the procedure mentioned earlier. As a result, a packet that is transmitted from the terminal 10 to the server 60 and received through the IF-α (i.e., an authorized packet in which the IP address A is not forged) is also discarded.

Furthermore, in the conventional technology, when a route is changed after an entry for the filter has been set by the above-mentioned method, e.g., when a route from the terminal 10 to the server 50 is changed from a route including the router 3 to a route including the router 5, an entry for the filter may not be automatically updated in synchronization with the change of the route, so that an authorized packet may be discarded.

Besides, a terminal that responds to the transmission-source inspection packet is an end terminal (i.e., the terminal 10). Therefore, in the conventional technology, when the terminal 10 is being shut down while the terminal 20 is making an attack, it is difficult to identify an interface that receives a packet transmitted from a terminal assigned with the IP address A with authorization.

Thus, it becomes increasingly important to accurately discard only an attack packet containing a forged transmission-source IP address without discarding an authorized packet.

SUMMARY

According to an aspect of an embodiment of the invention, an apparatus relays packets transferred over a network and discards an attack packet detected among the packets, the apparatus includes an inspection-packet outputting unit that outputs, when detecting the attack packet, an inspection packet in which a transmission-source address contained in the attack packet is set as a destination address and a destination address contained in the attack packet is set as a transmission-source address, a filter table storing unit that stores, when acquiring a response packet for the inspection packet, a transmission-source address, a destination address, and identification information of an interface, which has received the response packet, that are contained in the response packet, in a filter table in an associated manner, and a transfer control unit that determines whether to transfer a packet as a transfer object based on the filter table.

According to another aspect of an embodiment of the invention, a method serves for relaying packets transferred over a network and discarding an attack packet detected among the packets. The method includes: outputting, when detecting the attack packet, an inspection packet in which a transmission-source address contained in the attack packet is set as a destination address and a destination address contained in the attack packet is set as a transmission-source address; storing, when acquiring a response packet for the inspection packet, a transmission-source address, a destination address, and identification information of an interface, which has received the response packet, that are contained in the response packet, in a filter table in an associated manner; and determining whether to transfer a packet as a transfer object based on the filter table.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 15 illustrates an exemplary data structure of a filter table according to the third embodiment;

DESCRIPTION OF EMBODIMENT(S)

Preferred embodiments of the present invention will be explained with reference to accompanying drawings.

The present invention is not limited to the following embodiments.

[a] First Embodiment

Figure 1:
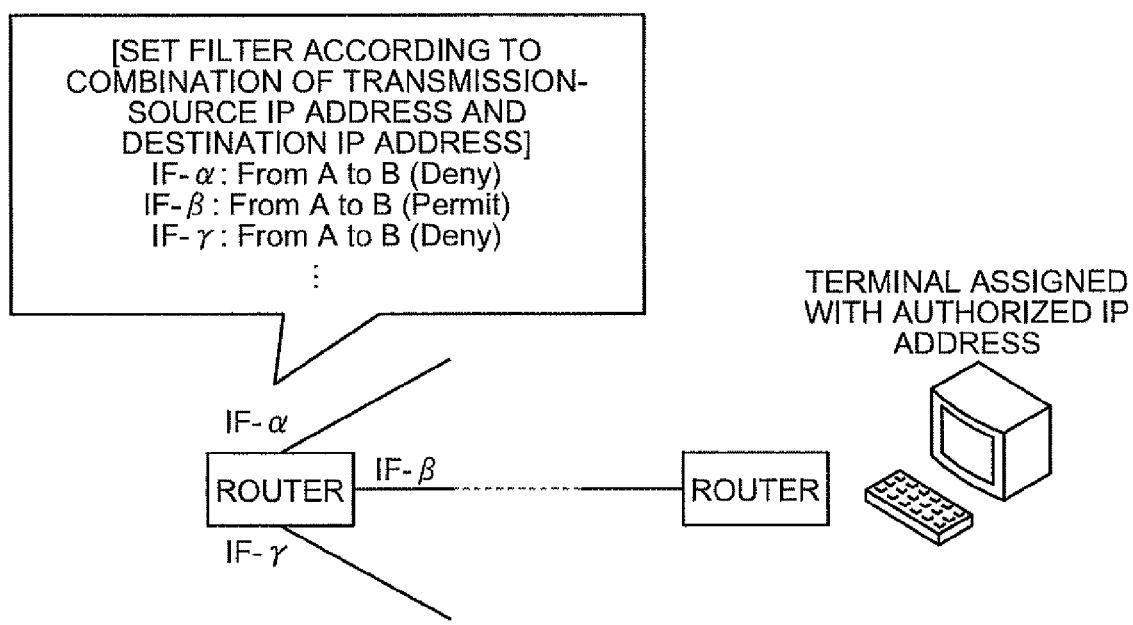
FIG. 1 is a schematic diagram for explaining an outline and features of a relay device according to an embodiment of the present invention.

An outline and features of a relay device (a router) according to a first embodiment of the present invention is described below. FIG. 1 is a schematic diagram for explaining the outline and the features of the relay device according to the present embodiment. As illustrated in FIG. 1, when setting a filter that provides a criterion for determining whether to transfer a packet, the relay device of the first embodiment sets the filter by associating a transmission IP address of the packet, a destination IP address of the packet, and an interface for receiving the packet with one another.

The filter illustrated in FIG. 1 is for permitting transfer of only a packet that has been input through an IF-β and has a transmission-source IP address A among packets transmitted to a destination IP address B, and discarding other packets (i.e., other packets transmitted to the destination IP address B).

In this manner, the relay device of the first embodiment sets the filter according to a combination of the transmission-source IP address, the destination IP address, and the interface for receiving the packet. Therefore, an attack packet can be accurately discarded, resulting in solving a problem that an authorized packet is erroneously discarded.

Figure 20:
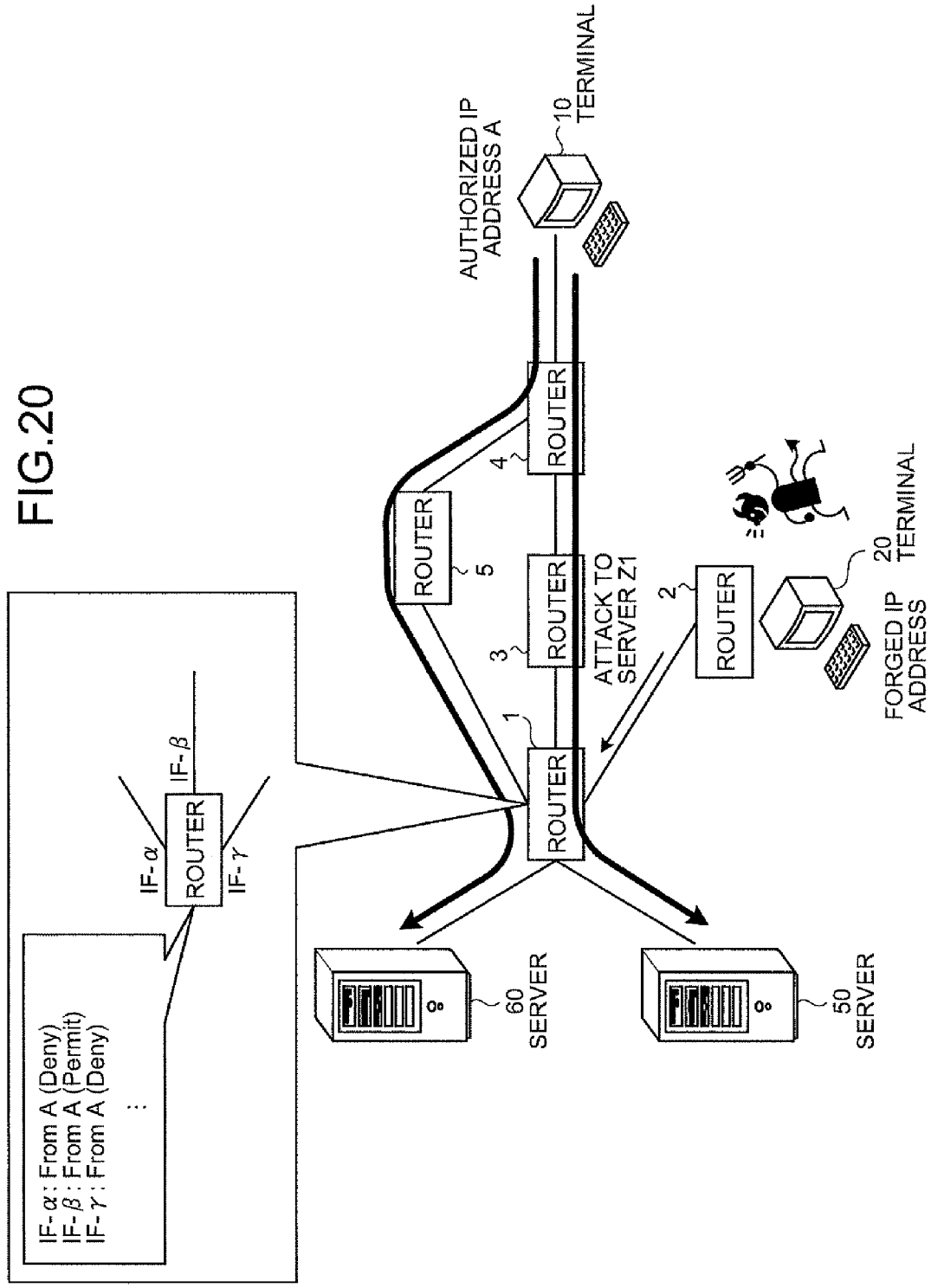
FIG. 20 is a schematic diagram for explaining a problem with the conventional technology.

For example, in the conventional technology, as illustrated in FIG. 20, the router 1 discards a packet that is transferred from the terminal 10 to the server 60. However, in the first embodiment, a packet addressed to the server 60 is not discarded because a packet filtering is performed by taking a destination IP address into consideration. Therefore, an authorized packet is not discarded, which may not be achieved in the conventional technology.

Figure 2:
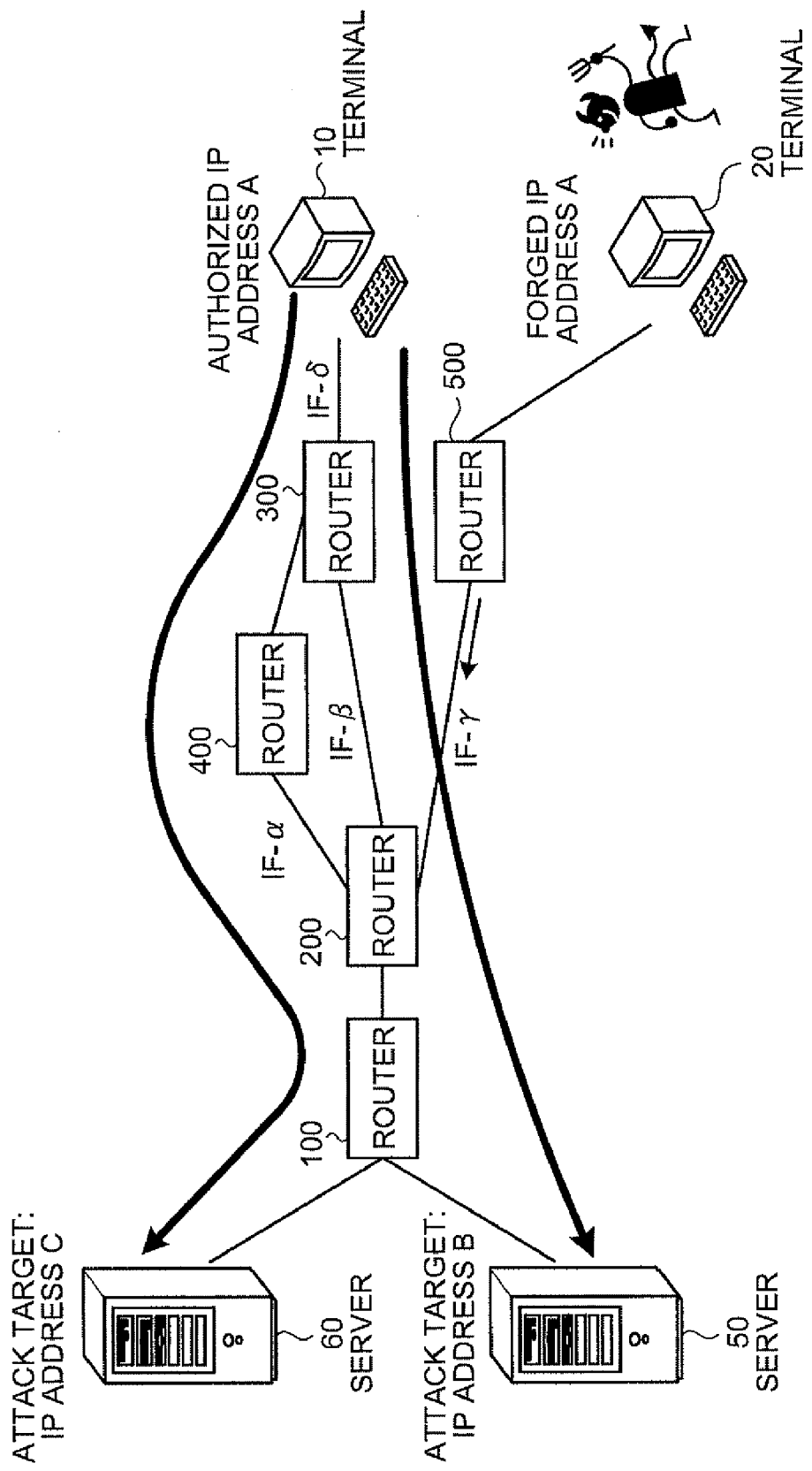
FIG. 2 is a schematic diagram of a configuration of a network system according to a first embodiment of the present invention.

A network system according to the first embodiment is described below. FIG. 2 is a schematic diagram (an example) of a configuration of a network system according to the first embodiment. As illustrated in FIG. 2, the network system includes the terminal 10 assigned with an authorized IP address A, the terminal 20 assigned with a forged IP address A, the servers 50 and 60 that provide various services in response to a service request, and routers 100, 200, 300, 400, and 500.

The terminal 10 transmits a packet to the server 50 via the routers 300, 400, 200, and 100, and transmits a packet to the server 60 via the routers 300, 200, and 100. The terminal 20 transmits a packet to the server 50 via the routers 500, 200, and 100.

Figure 3:
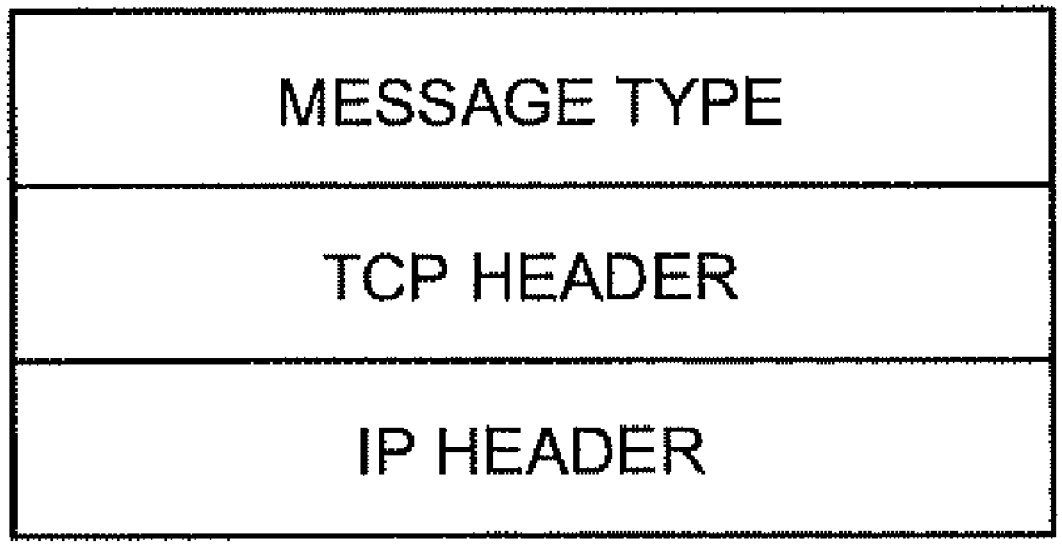
FIG. 3 illustrates an exemplary data structure of a packet according to the first embodiment.

A data structure of a packet to be used in the network system according to the first embodiment is described below. FIG. 3 illustrates an exemplary data structure of a packet according to the first embodiment. As illustrated in FIG. 3, the packet contains a message type, a transmission control protocol (TCP) header, and an IP header. The TCP header and the IP header are the same as a commonly-known TCP header and a commonly-known IP header, respectively, and therefore, explanation thereof will be omitted.

The message type contains a number for identifying a type of a packet. When "0" is contained in the message type of a packet, the packet is identified as a transmission-source inspection packet (for request). When "1" is contained in the message type a packet, the packet is identified as a transmission-source inspection packet (for response). When "2" is contained in the message type of a packet, the packet is identified as a send request packet.

The transmission-source inspection packet (for request) is a packet that a router that has detected an attack packet transmits by taking a transmission-source IP address of the attack packet as a destination IP address. The transmission-source inspection packet (for response) is a packet that a router that accommodates a terminal identified by the destination IP address of the transmission-source inspection packet (for request) returns by taking a transmission source IP address of the transmission-source inspection packet (for request) as a destination IP address.

The send request packet is a packet that a router that has detected a change of a route of a packet uses to give instruction to transmit the transmission-source inspection packet (for request) so that a filter entry corresponding to a new route can be created (the send request packet will be described in detail in a third embodiment of the present invention, and therefore, explanation thereof is not given in the first embodiment).

Figure 4:
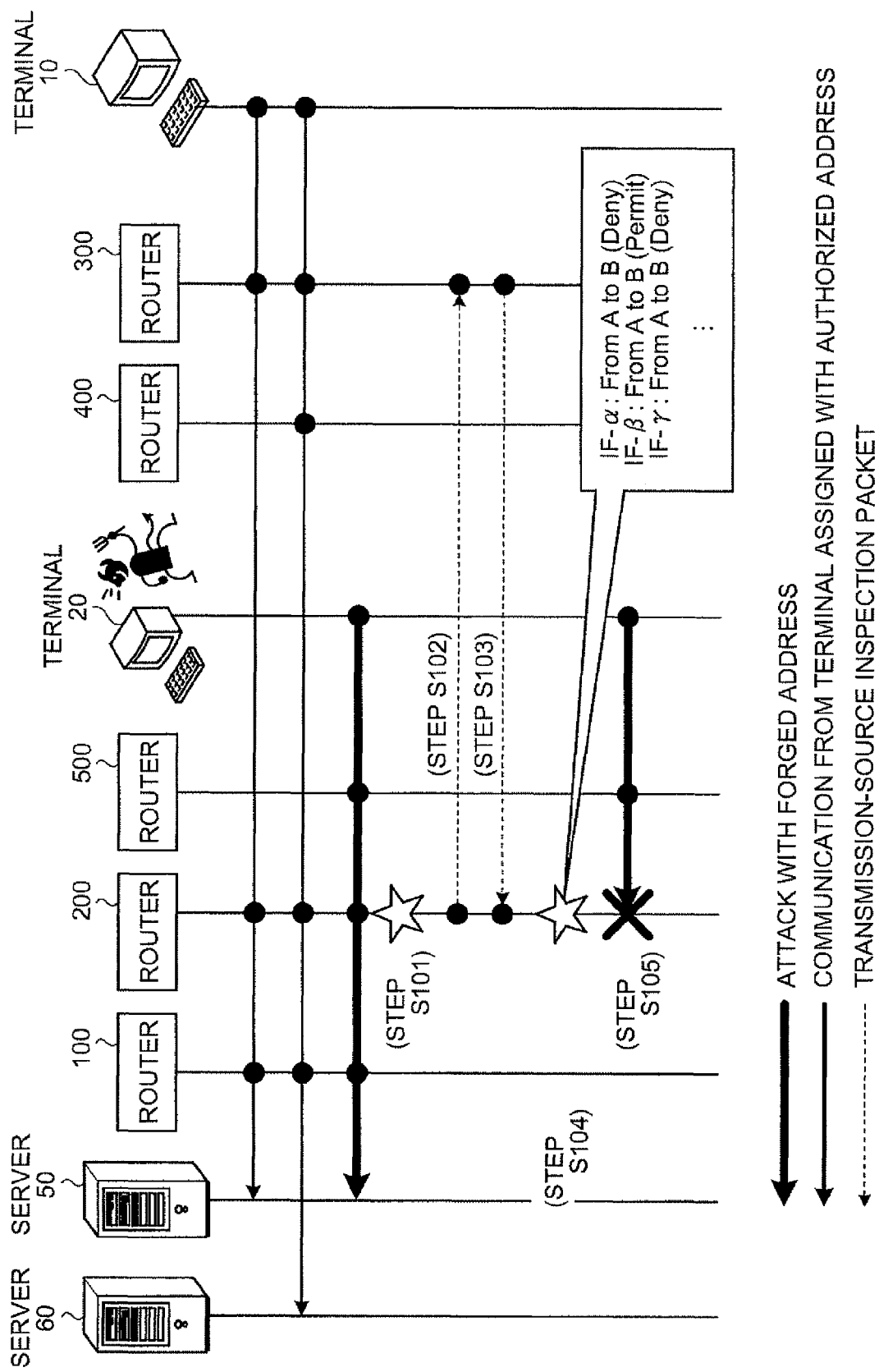
FIG. 4 is a schematic diagram for explaining a process performed by the network system according to the first embodiment.

A process performed by the network system for transmitting a packet from the terminal 10 to each of the servers 50 and 60 and discarding a packet (an attack packet) sent from the terminal 20 is described below. FIG. 4 is a schematic diagram for explaining the process performed by the network system according to the first embodiment.

As illustrated in FIG. 4, the router 200 receives not less than a predetermined amount of packets each having the same transmission source IP address A and the same destination IP address B from a plurality of different interfaces (i.e., IF-α, IF-β, and IF-γ, see FIG. 2) in a predetermined time (Step S101).

When detecting an attack packet, the router 200 creates the transmission-source inspection packet (for request) and then transmits the created transmission-source inspection packet (for request) (Step S102). A message type of the transmission-source inspection packet (for request) contains "0", B (i.e., a destination IP address contained in the attack packet) is set as a transmission-source IP address of the transmission-source inspection packet (for request), and A (i.e., a transmission-source IP address contained in the attack packet) is set as a destination IP address of the transmission-source inspection packet (for request).

The router 300 that accommodates the terminal 10 and has received the transmission-source inspection packet (for request) transmits the transmission-source inspection packet (for response) to the router 200 (Step S103). A message type of the transmission-source inspection packet (for response) contains "1", A is set as a transmission-source IP address of the transmission-source inspection packet (for response), and B is set as a destination IP address of the transmission-source inspection packet (for response).

Then, the router 200 sets a filter so as to permit transmission of a packet that contains the transmission-source IP address A and the destination IP address B and is received through the IF-β, i.e., an interface that has received the transmission-source inspection packet (for response) and so as to discard other packets (Step S104). The router 300 that is located on a path of the transmission-source inspection packet also sets a filter so as to permit transmission of only a packet that contains the transmission-source IP address A and the destination IP address B and is received through an IF-δ, although not illustrated in FIG. 4.

The router 200 discards a packet that is transmitted from the terminal 20 assigned with the forged address A and received through the IF-γ and relays a packet that is transmitted from the terminal 10 to each of the servers 50 and 60 according to the filter set at Step S104 (Step S105). Thereafter, Steps S101 to S105 are repeated at regular intervals to refresh entries in the filter table.

Figure 5:
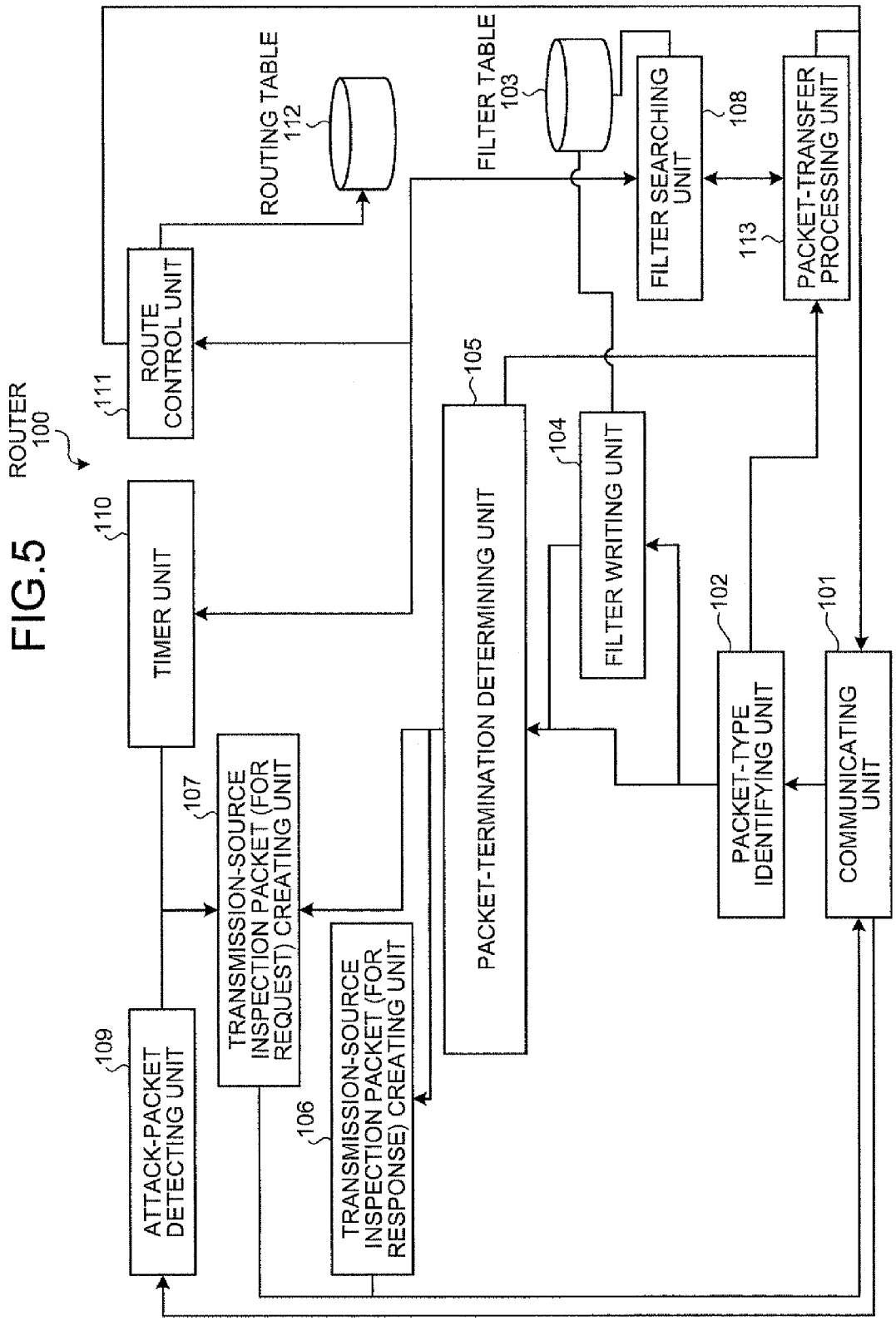
FIG. 5 is a functional block diagram of a configuration of a router according to the first embodiment.

A configuration of the router 100 according to the first embodiment is described below. The configurations of the routers 200 to 500 are the same as that of the router 100, and therefore, explanation thereof will be omitted. FIG. 5 is a functional block diagram of the configuration of the router 100 according to the first embodiment. As illustrated in FIG. 5, the router 100 includes a communicating unit 101, a packet-type identifying unit 102, a filter table 103, a filter writing unit 104, a packet-termination determining unit 105, a transmission-source inspection packet (for response) creating unit 106, a transmission-source inspection packet (for request) creating unit 107, a filter searching unit 108, an attack-packet detecting unit 109, a timer unit 110, a route control unit 111, a routing table 112, and a packet-transfer processing unit 113.

The communicating unit 101 performs processing for receiving a packet from the network and transmitting a packet to the network. The communicating unit 101 outputs a received packet to the packet-type identifying unit 102 and the attack-packet detecting unit 109.

The packet-type identifying unit 102 identifies a type of a packet based on the message type contained in the packet, and outputs the packet to one of the filter writing unit 104, the packet-termination determining unit 105, and the packet-transfer processing unit 113 based on an identification result.

The packet-type identifying unit 102 outputs a packet to the packet-termination determining unit 105 when the packet is identified as the transmission-source inspection packet (for request) (i.e., when "0" is contained in the message type).

The packet-type identifying unit 102 outputs a packet to the filter writing unit 104 when the packet is identified as the transmission-source inspection packet (for response) (i.e., when "1" is contained in the message type). The packet-type identifying unit 102 outputs other packets to the packet-transfer processing unit 113.

Figures 6, 7:
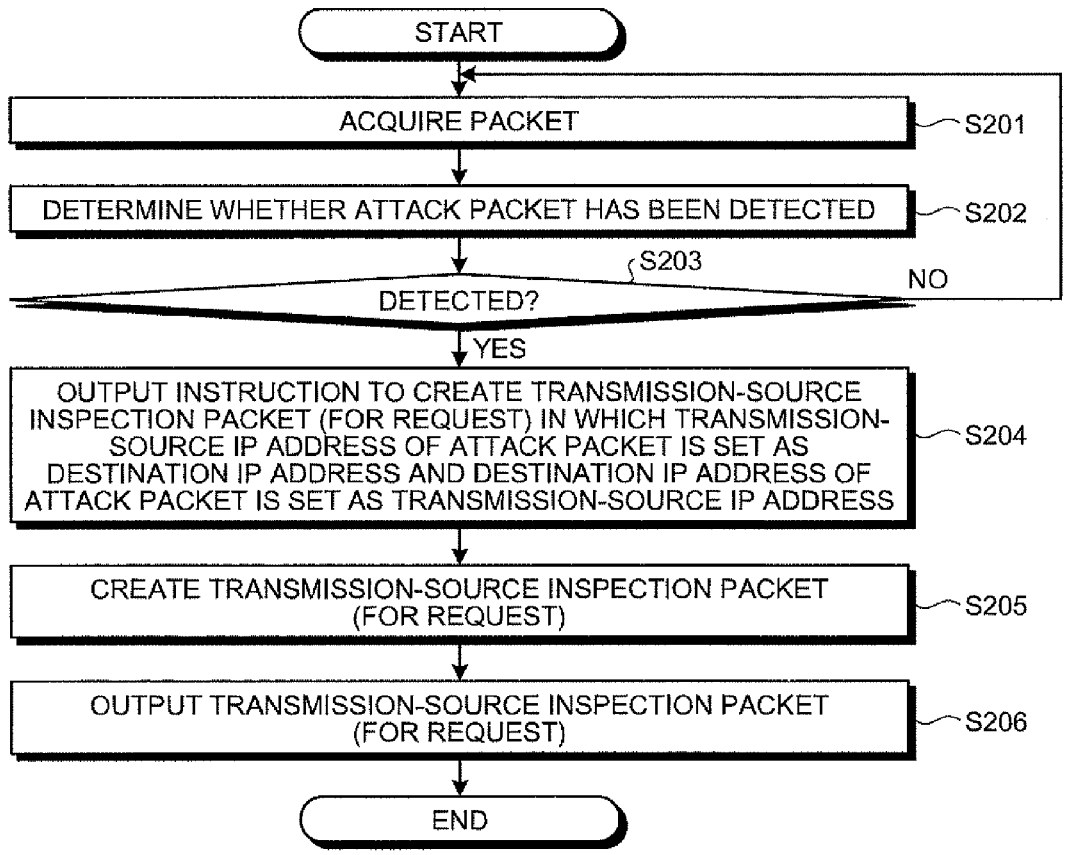
FIG. 6 illustrates an exemplary data structure of a filter table.
FIG. 7 is a flowchart of a process performed when the router of the first embodiment detects an attack packet.

The filter table 103 is a table for storing information for determining whether to discard a packet. FIG. 6 illustrates an exemplary data structure of the filter table 103. As illustrated in FIG. 6, the filter table 103 contains a transmission-source IP address, a destination IP address, a receive interface, processing, and a time at which a corresponding line is registered (updated).

In the first line of FIG. 6, information is registered for discarding a packet that is received through the interface (IF-α) and contains the transmission-source IP address A and the destination IP address B. In the second line, information is registered for permitting transfer of a packet that is received through the interface (IF-β) and contains the transmission-source IP address A and the destination IP address B. In the third line, information is registered for discarding a packet that is received through the interface (IF-γ) and contains the transmission-source IP address A and the destination IP address B.

Returning to the explanation of FIG. 5, the filter writing unit 104 creates an entry for the filter table 103 based on a transmission-source IP address, a destination IP address, and the number of a receive interface that are contained in the transmission-source inspection packet (for response). The filter writing unit 104 sets "Permit" only to a processing field corresponding to a receive interface for the transmission-source inspection packet (for response) in the filter table, sets "Deny" to processing fields corresponding to other interfaces, and registers a current time in a time field. When the same entry has already been contained in the filter table 103, the filter writing unit 104 updates (renews) a current time.

The packet-termination determining unit 105 determines whether to terminate or relay the transmission-source inspection packet (for request or for response). More specifically, when a destination IP address of the transmission-source inspection packet (for request or for response) is in a subnet of own router, the packet-termination determining unit 105 terminates the transmission-source inspection packet (for request and for response) and passes processing to either the transmission-source inspection packet (for request) creating unit 107 or the transmission-source inspection packet (for response) creating unit 106. It is assumed here that the packet-termination determining unit 105 contains an IP address of a terminal in the subnet of the own router, although not illustrated in FIG. 5.

The packet-termination determining unit 105 instructs the transmission-source inspection packet (for response) creating unit 106 to create the transmission-source inspection packet (for response) in which the destination IP address of the transmission-source inspection packet (for request) that has been terminated is set as a transmission-source IP address and the transmission-source IP address of the transmission-source inspection packet (for request) is set as a destination IP address.

The transmission-source inspection packet (for response) creating unit 106 creates the transmission-source inspection packet (for response) based on the instruction from the packet-termination determining unit 105 (see FIG. 3 for a format of the transmission-source inspection packet (for response)). The transmission-source inspection packet (for response) creating unit 106 outputs the created transmission-source inspection packet (for response) to the communicating unit 101 for transmission to the network.

The transmission-source inspection packet (for request) creating unit 107 creates the transmission-source inspection packet (for request) based on an instruction from the attack-packet detecting unit 109, the timer unit 110, and the like (see FIG. 3 for a format of the transmission-source inspection packet (for request)). The transmission-source inspection packet (for request) creating unit 107 outputs the transmission-source inspection packet (for request) to the communicating unit 101 for transmission to the network.

The filter searching unit 108 searches the filter table 103 based on a condition (a transmission-source IP address, a destination IP address, and an interface) output from the packet-transfer processing unit 113, and outputs a search result ("Permit" or "Deny") to the packet-transfer processing unit 113. The filter searching unit 108 outputs data in the filter table 103 to the timer unit 110 according to a request from the timer unit 110, and deletes an entry from the filter table 103 according to an instruction from the timer unit 110.

The attack-packet detecting unit 109 detects an attack packet. It is assumed that the attack-packet detecting unit 109 employs a method for detecting the attack packet as that of the conventional technology. When detecting the attack packet, the attack-packet detecting unit 109 instructs the transmission-source inspection packet (for request) creating unit 107 to create the transmission-source inspection packet (for request) in which the transmission-source IP address of the attack packet is set as a destination IP address and the destination IP address of the attack packet is set as a transmission-source IP address.

The timer unit 110 retransmits the transmission-source inspection packet (for request) and deletes an entry that has been timed out from the filter table 103. A process for retransmitting the transmission-source inspection packet (for request) by the timer unit 110 is described below. Retransmission of the transmission-source inspection packet (for request) enables entries in the filter table 103 to be refreshed.

The timer unit 110 causes the filter searching unit 108 to search for an IP address that belongs to the subnet of the own router among transmission-source IP addresses in the filter table 103 at regular time intervals (t1). When a predetermined time has elapsed since a time set in the time field of the entry identified by a search, the timer unit 110 instructs the transmission-source inspection packet (for request) creating unit 107 to set a value in a transmission-source IP address field of corresponding entry information to a transmission-source IP address and set a value in a destination IP address field of the corresponding entry information to a destination IP address.

A process for deleting an entry from the filter table 103 by the timer unit 110 is described below. The timer unit 110 causes the filter searching unit 108 to search for a time field in the filter table 103 and deletes an entry for which a predetermined time has elapsed at regular time intervals (t2: t2>t1) (the timer unit 110 requests the filter searching unit 108 to delete the entry).

The route control unit 111 controls a route of a packet. The routing table 112 is a table for storing information about a route to be used for relaying a packet.

The packet-transfer processing unit 113 performs existing processing for transferring a packet and discarding a packet in which a transmission-source IP address is manipulated. The packet-transfer processing unit 113 causes the filter searching unit 108 to search the filter table 103 for an entry corresponding to a transmission-source IP address, a destination IP address, and a receive interface of each received packet. When such an entry is present and a processing field of the entry contains "Deny", the packet-transfer processing unit 113 discards a corresponding received packet.

On the other hand, when such an entry is not present or the processing field of the corresponding packet contains "Permit", the packet-transfer processing unit 113 transfers the corresponding received packet.

A procedure of each process performed by the router according to the first embodiment is described below. More specifically, a process performed when the router detects an attack packet (processes corresponding to Steps S101 and S102 of FIG. 4), a process performed when the router acquires the transmission-source inspection packet (for request) (a process corresponding to Step S103 of FIG. 4), a process performed when the router acquires the transmission-source inspection packet (for response) (a process corresponding to Step S104 of FIG. 4), and a process performed when the router acquires other packets (a process corresponding to Step S105 of FIG. 4) are described below in this order.

The process performed when the router detects an attack packet is described below. FIG. 7 is a flowchart of the process performed when the router of the first embodiment detects an attack packet. As illustrated in FIG. 7, the attack-packet detecting unit 109 acquires a packet (Step S201), and determines whether an attack packet has been detected (Step S202). When the attack packet has not been detected (NO at Step S203), the process returns to Step S201.

On the other hand, when the attack packet has been detected (YES at Step S203), the attack-packet detecting unit 109 outputs to the transmission-source inspection packet (for request) creating unit 107 an instruction to create the transmission-source inspection packet (for request) in which a transmission-source IP address of the attack packet is set as a destination IP address and a destination IP address of the attack packet is set as a transmission-source IP address (Step S204).

The transmission-source inspection packet (for request) creating unit 107 creates the transmission-source inspection packet (for request) (Step S205), and outputs the transmission-source inspection packet (for request) to the communicating unit 101 for transmission to the network (Step S206).

Figure 8:
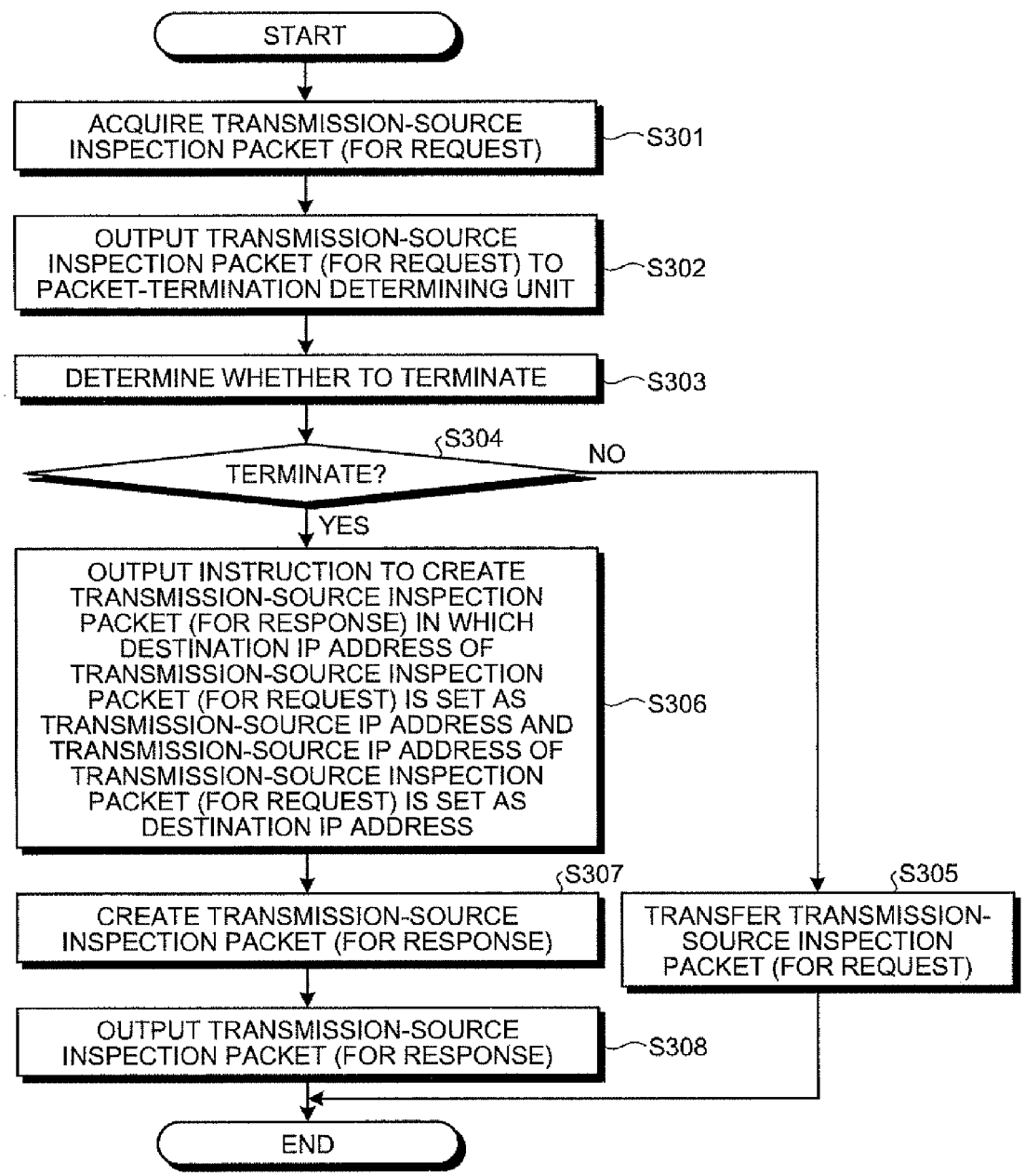
FIG. 8 is a flowchart of a process performed when the router of the first embodiment acquires a transmission-source inspection packet (for request)

The process performed when the router acquires the transmission-source inspection packet (for request) is described below. FIG. 8 is a flowchart of the process performed when the router of the first embodiment acquires the transmission-source inspection packet (for request). As illustrated in FIG. 8, the packet-type identifying unit 102 acquires the transmission-source inspection packet (for request) from the communicating unit 101 (Step S301), and outputs the transmission-source inspection packet (for request) to the packet-termination determining unit 105 (Step S302).

The packet-termination determining unit 105 determines whether to terminate the transmission-source inspection packet (for request) (Step S303). When the transmission-source inspection packet (for request) is not terminated (NO at Step S304), the packet-termination determining unit 105 transfers the transmission-source inspection packet (for request) (Step S305).

On the other hand, when the transmission-source inspection packet (for request) is terminated (YES at Step S304), the packet-termination determining unit 105 outputs to the transmission-source inspection packet (for response) creating unit 106 an instruction to create the transmission-source inspection packet (for response) in which the destination IP address of the transmission-source inspection packet (for request) is set as a transmission-source IP address and the transmission-source IP address of the transmission-source inspection packet (for request) is set as a destination IP address (Step S306).

The transmission-source inspection packet (for response) creating unit 106 creates the transmission-source inspection packet (for response) (Step S307), and outputs the transmission-source inspection packet (for response) to the communicating unit 101 for transmission to the network (Step S308).

Figure 9:
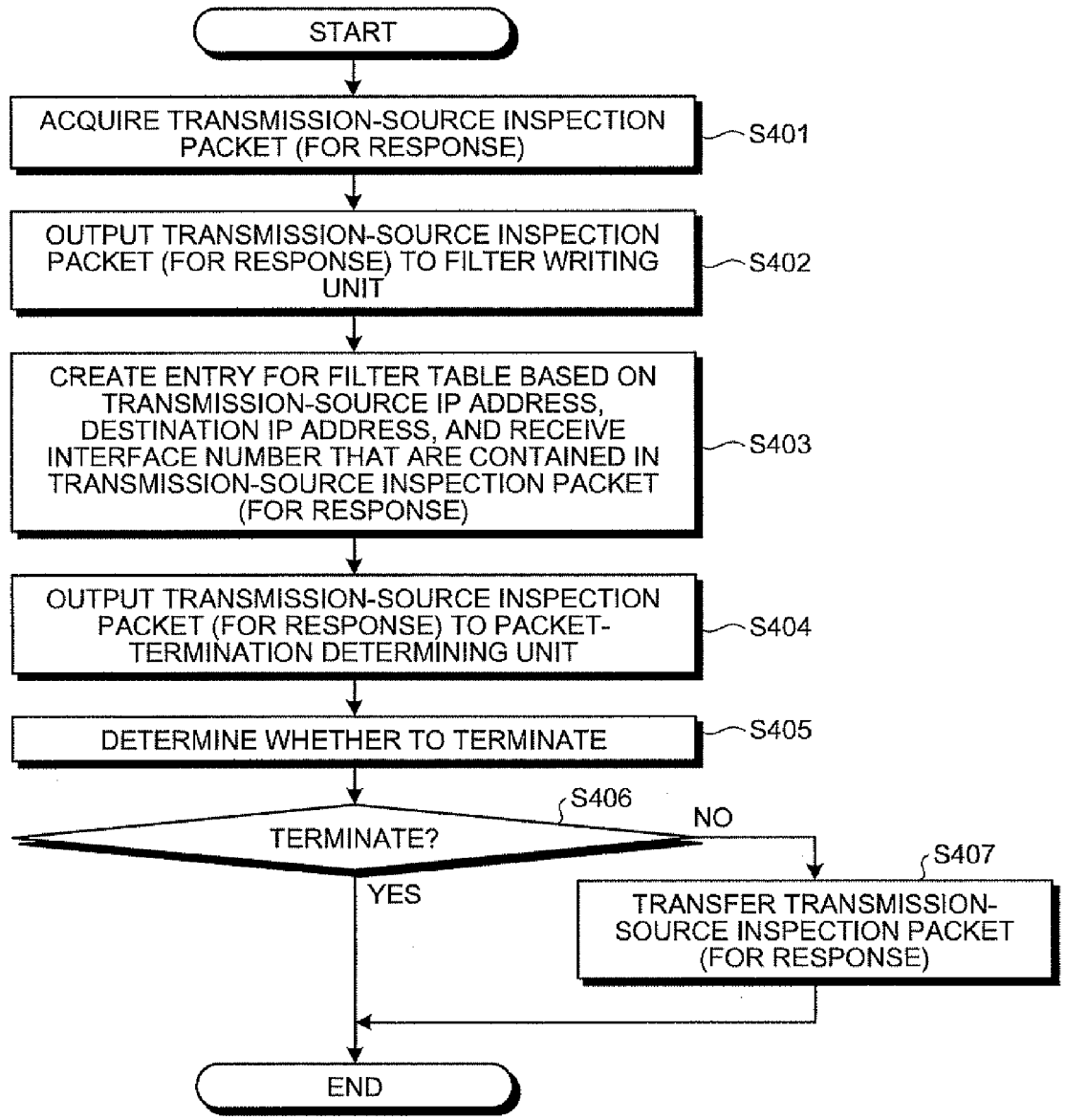
FIG. 9 is a flowchart of a process performed when the router of the first embodiment acquires a transmission-source inspection packet (for response)

The process performed when the router acquires the transmission-source inspection packet (for response) is described below. FIG. 9 is a flowchart of the process performed when the router of the first embodiment acquires the transmission-source inspection packet (for response).

As illustrated in FIG. 9, the packet-type identifying unit 102 acquires the transmission-source inspection packet (for response) from the communicating unit 101 (Step S401), and outputs the transmission-source inspection packet (for response) to the filter writing unit 104 (Step S402).

The filter writing unit 104 creates an entry for the filter table 103 based on the transmission-source IP address, the destination IP address, and the number of a receive interface that are contained in the transmission-source inspection packet (for response) (Step S403), and outputs the transmission-source inspection packet (for response) to the packet-termination determining unit (Step S404).

The packet-termination determining unit 105 determines whether to terminate the transmission-source inspection packet (for response) (Step S405). When the transmission-source inspection packet (for response) is determined not to be terminated (NO at Step S406), the packet-termination determining unit 105 transfers the transmission-source inspection packet (for response) (Step S407).

On the other hand, when the transmission-source inspection packet (for response) is determined to be terminated (YES at Step S406), the packet-termination determining unit 105 ends the process.

Figure 10:
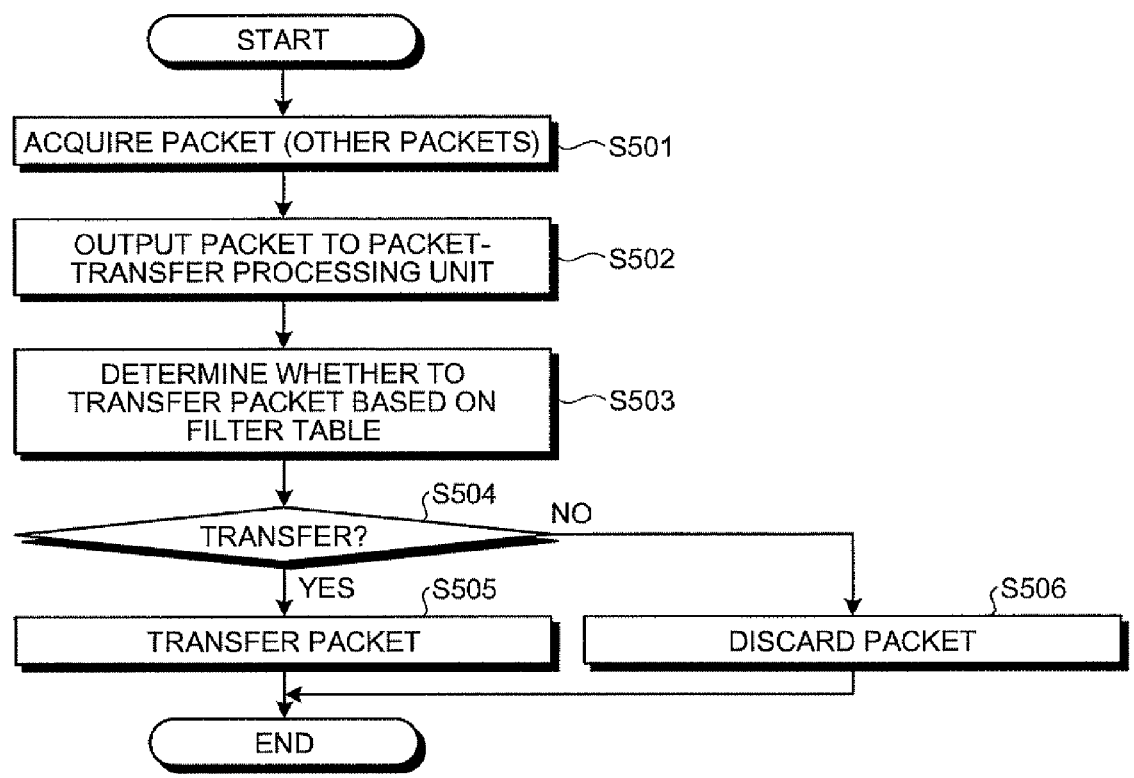
FIG. 10 is a flowchart of a process performed when the router of the first embodiment acquires other packets.

The process performed when the router acquires other packets (normal packets) is described below. FIG. 10 is a flowchart of a process performed when the router of the first embodiment acquires other packets. As illustrated in FIG. 10, the packet-type identifying unit 102 acquires a packet (other packets) from the communicating unit 101 (Step S501), and outputs the packet to the packet-transfer processing unit 113 (Step S502).

The packet-transfer processing unit 113 determines whether to transfer the packet based on the filter table in cooperation with the filter searching unit 108 (Step S503). When the packet is determined to be transferred (YES at Step S504), the packet-transfer processing unit 113 transfers the packet according to an instruction from the route control unit 111 (Step S505). On the other hand, when the packet is not determined to be transferred (NO at Step S504), the packet-transfer processing unit 113 discards the packet (Step S506).

In the above-mentioned flowcharts of FIGS. 7 to 10, each process is described with reference to the functional block diagram of FIG. 5 (i.e., each processing unit of the router 100). However, functional units of each of the routers 200 to 500 also perform the same processes as those of the router 100.

As described above, when detecting an attack packet, each of the routers 100 to 500 in the network system of the first embodiment outputs the transmission-source inspection packet (for request) in which the transmission-source IP address of the attack packet is set as a destination IP address and the destination IP address of the attack packet is set as a transmission-source IP address. Then, when receiving the transmission-source inspection packet (for response), each of the routers 100 to 500 registers in the filter table 103 a transmission-source IP address, a destination IP address, and identification information for an interface that has received this response packet, which are contained in the transmission-source inspection packet (for response), in association with one another. Each of the routers 100 to 500 then determines whether to transfer a packet as a transfer object based on the filter table 103. Therefore, the attack packet can be accurately discarded, so that a problem that an authorized packet is erroneously discarded can be prevented.

[b] Second Embodiment

An outline and features of a relay device (a router) according to a second embodiment of the present invention will be described below. When the relay device of the second embodiment receives the transmission-source inspection packet (for request) addressed to a terminal that is connected to a subnet of the relay device and is being shut down, the relay device outputs the transmission-source inspection packet (for response) on behalf of the terminal.

Thus, the relay device outputs the transmission-source inspection packet (for response) on behalf of the terminal connected to the subnet of the relay device, so that even when an authorized terminal is being shut down, an entry for a filter table can be accurately set.

Figure 11:
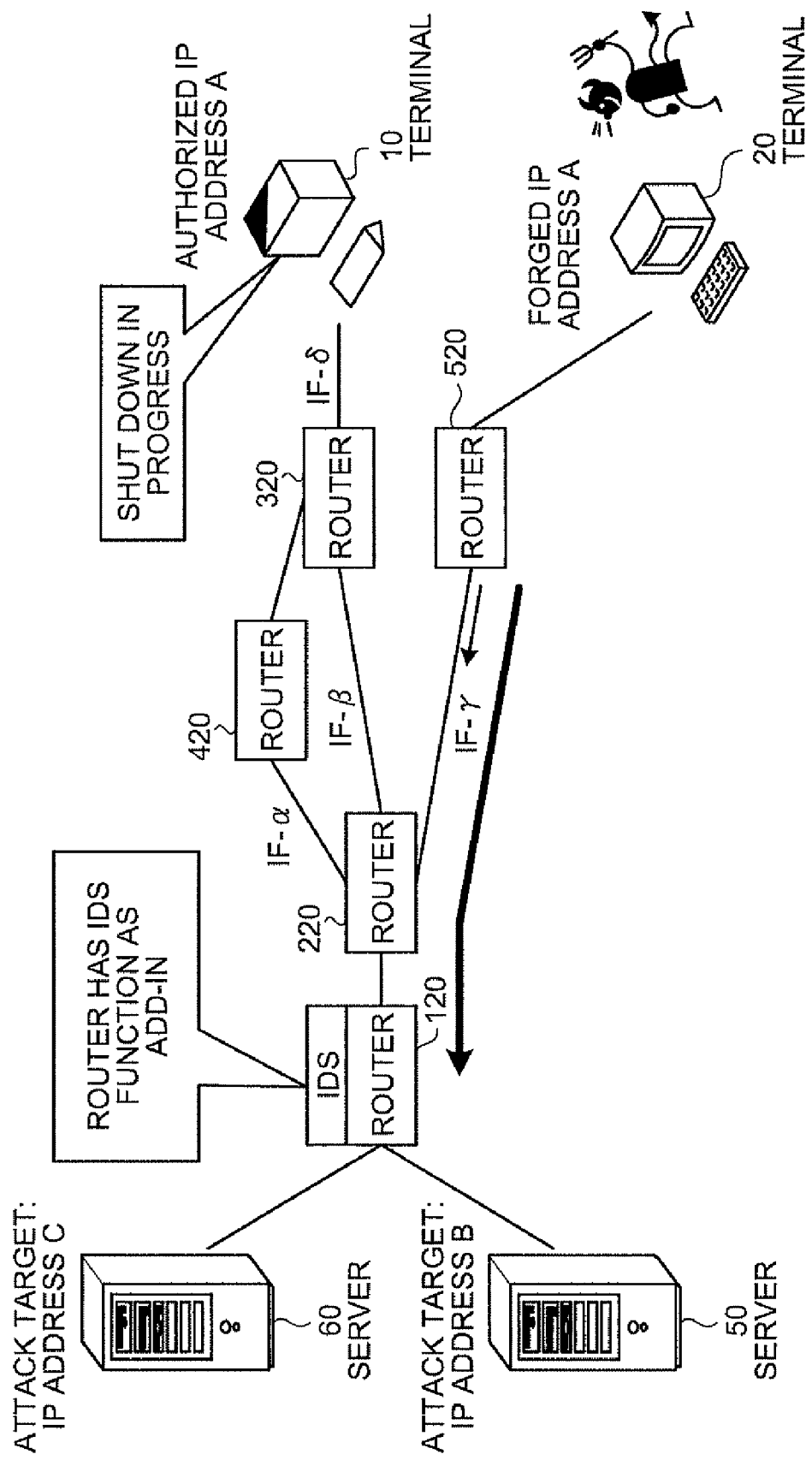
FIG. 11 is a schematic diagram of a configuration of a network system according to a second embodiment of the present invention.

A network system according to the second embodiment is described below. FIG. 11 is a schematic diagram (an example) of a configuration of the network system according to the second embodiment. As illustrated in FIG. 11, the network system includes the terminal 10 assigned with an authorized IP address A (shut down in progress), the terminal 20 assigned with a forged IP address A, the servers 50 and 60 that provides various services in response to a service request, and routers 120, 220, 320, 420, and 520.

The router 120 detects an attack packet by an intrusion detection system (IDS) to trigger an output of the transmission-source inspection packet (for request). The IDS is a function for analyzing a packet that flows over the network and detecting a packet that may be an unauthorized access through pattern matching.

Figure 12:
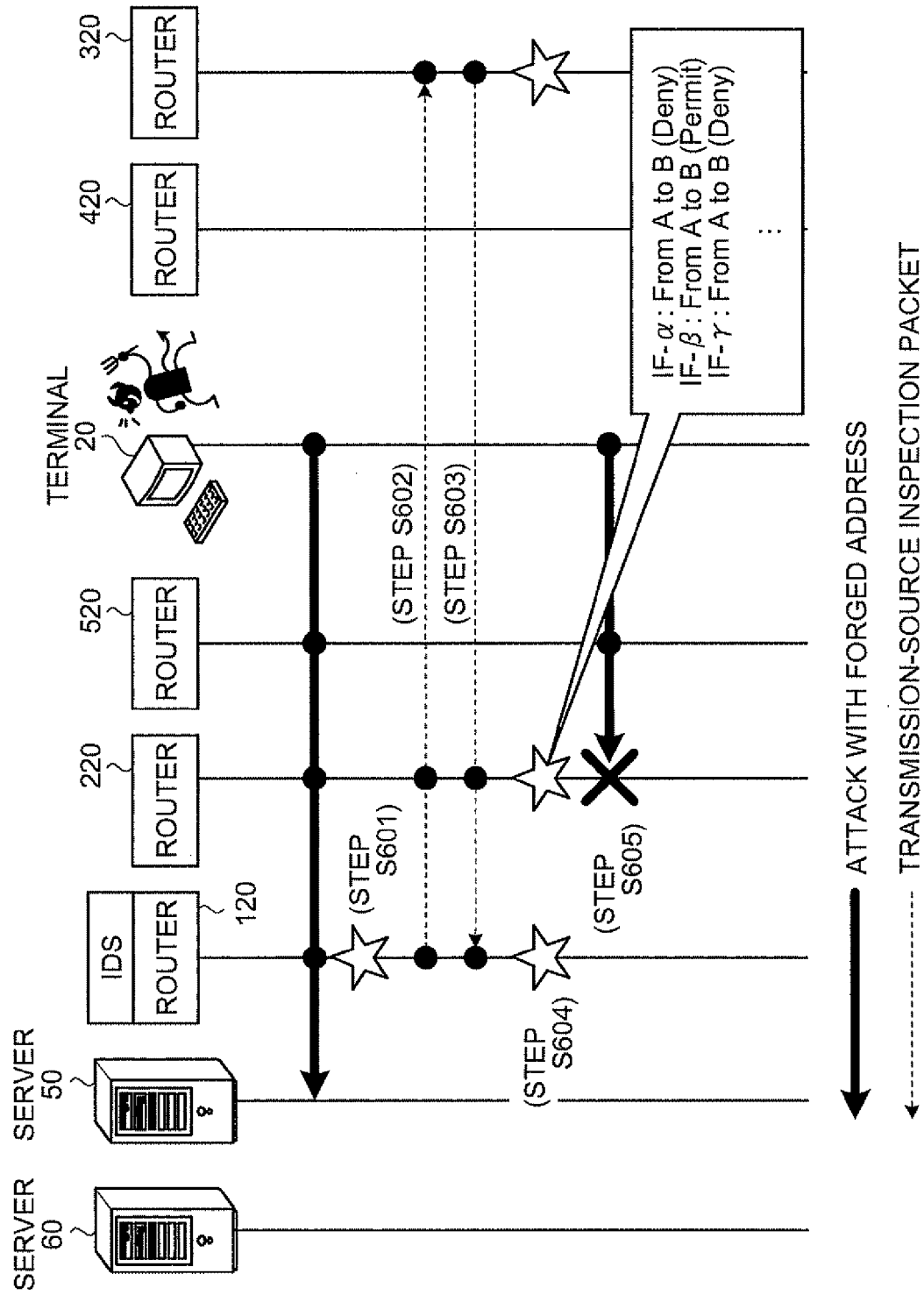
FIG. 12 is a schematic diagram for explaining a process performed by the network system according to the second embodiment.

A process performed by the network system of the second embodiment is described below. FIG. 12 is a schematic diagram for explaining the process performed by the network system according to the second embodiment. As illustrated in FIG. 12, the IDS of the router 120 detects a malicious packet (an attack packet) that contains the IP address A as a transmission-source IP address (Step S601).

The router 120 then transmits the transmission-source inspection packet (for request) (Step S602). A message type of the transmission-source inspection packet (for request) contains "0", B (i.e., a destination IP address contained in the attack packet) is set as a transmission-source IP address of the transmission-source inspection packet (for request), and A (i.e., a transmission-source IP address contained in the attack packet) is set as a destination IP address of the transmission-source inspection packet (for request). As a result, the transmission-source inspection packet (for request) is transmitted to the terminal 10 assigned with the authorized IP address A.

The router 320 that accommodates the terminal 10 and has received the transmission-source inspection packet (for request) transmits the transmission-source inspection packet (for response) to the router 220 (Step S603). A message type of the transmission-source inspection packet (for response) contains "1", A is set as a transmission-source IP address of the transmission-source inspection packet (for response), and B is set as a destination IP address of the transmission-source inspection packet (for response).

Then, the router 220 sets a filter so as to permit transmission of a packet that contains the transmission-source IP address A and the destination IP address B and is received through the IF-β, i.e., an interface that has received the transmission-source inspection packet (for response) and so as to discard others (Step S604). The router 320 that is located on a path of the transmission-source inspection packet also sets a filter so as to permit transmission of only a packet that contains the transmission-source IP address A and the destination IP address B and is received through an IF-δ, although not illustrated in FIG. 12. Furthermore, the router 120 sets a filter so as to permit transmission of only a packet that contains the transmission-source IP address A and the destination IP address B and is received through an interface that has received the transmission-source inspection packet.

The router 220 discards a packet that is transmitted from the terminal 20 assigned with the forged address A and is received through the IF-γ, and relays a packet that is transmitted from the terminal 10 that has been activated to each of the servers 50 and 60 according to the filter set at Step S604 (Step S605). Thereafter, Steps S601 to S605 are repeated at regular intervals to refresh entries in the filter table.

A configuration of each of the routers 120 to 520 of the second embodiment is the same as that illustrated in FIG. 5, and therefore, explanation thereof will be omitted. It is assumed that the attack-packet detecting unit 109 of the router 120 detects an attack packet by using the IDS method.

As described above, in the network system according to the second embodiment, when the router 320 (an example) receives the transmission-source inspection packet (for request) addressed to a terminal that is connected to a subnet of the router 320 and is being shut down, the router 320 outputs the transmission-source inspection packet (for response) on behalf of the terminal. Therefore, even when an authorized terminal is being shut down, an entry in the filter table can be accurately set. In other words, each of the routers 120 to 520 can identify an interface that is designated to receive a packet transmitted from the authorized terminal regardless of whether the authorized terminal that is legitimately assigned with an IP address corresponding to a forged IP address is ON or OFF.

[c] Third Embodiment

An outline and features of a relay device (a router) according to a third embodiment of the present invention will be described below. The relay device of the third embodiment outputs, when changing a route for transferring a packet over a network, a packet for requesting an output of a transmission-source inspection packet (for request) (hereinafter, referred to as "a send request packet") to other relay devices that are connected to a new route, and causes a relay device that has received the send request packet to output the transmission-source inspection packet (for request) so that a filter table can be updated.

Thus, when a route is changed, the send request packet is output to the other relay devices connected to a new route and the transmission-source inspection packet (for request) is output by the other relay devices. Therefore, it is possible to discard an attack packet containing a forged transmission-source IP address in coordination with a route control protocol.

Figure 13:
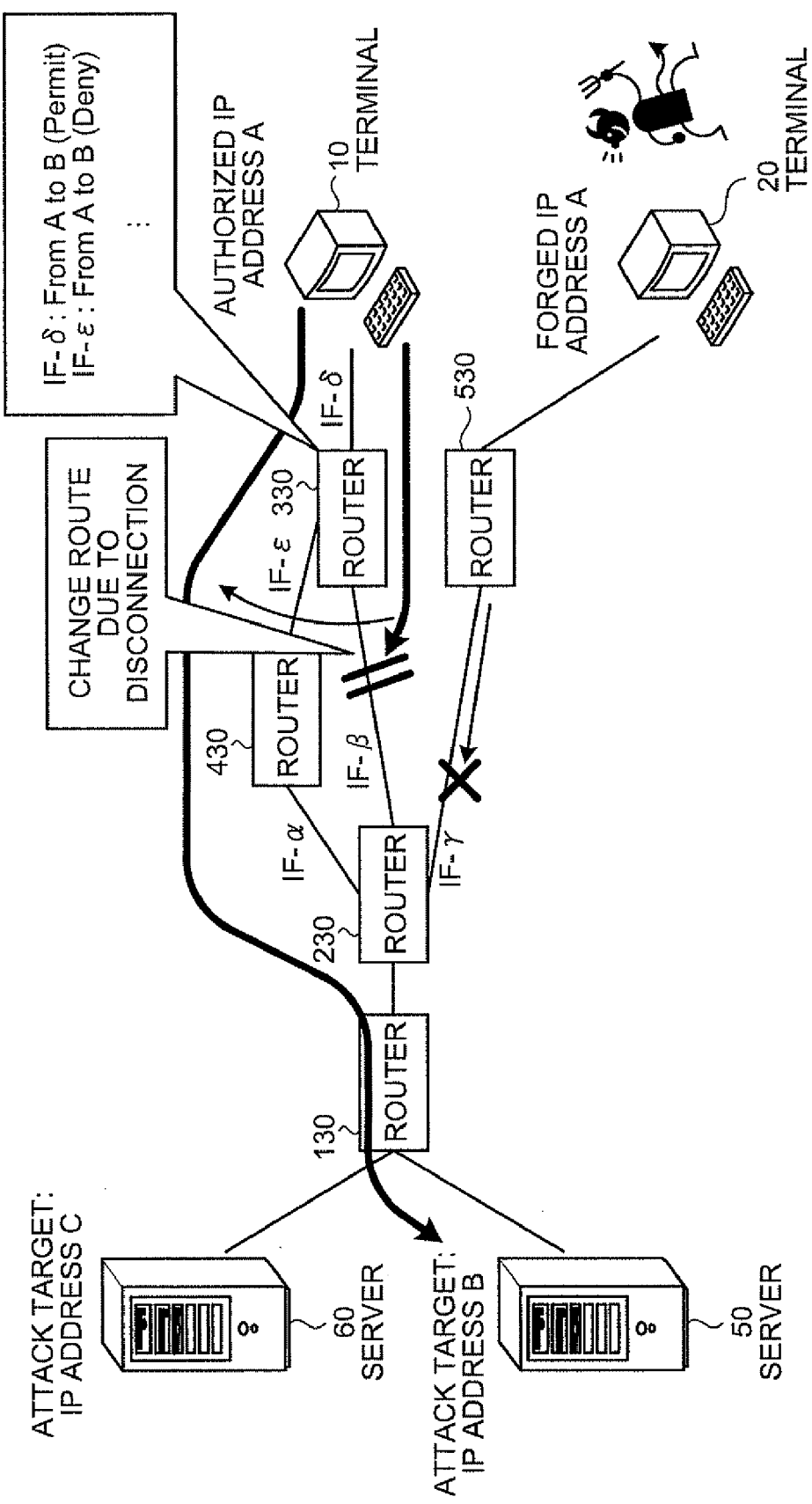
FIG. 13 is a schematic diagram of a network system according to a third embodiment of the present invention.

A network system according to the third embodiment is described below. FIG. 13 is a schematic diagram of the network system according to the third embodiment. As illustrated in FIG. 13, the network system includes the terminal 10 assigned with an authorized IP address, the terminal 20 assigned with a forged IP address, the servers 50 and 60 that provide various services in response to a service request, and routers 130, 230, 330, 430, and 530.

In the example illustrated in FIG. 13, a route is changed because of disconnection between the routers 230 and 330. Accordingly, a route from the terminal 10 to the server 50 is changed to include the router 430 (a route from the terminal 10 to the server 50 does not include the router 430 before the route is changed).

Figure 14:
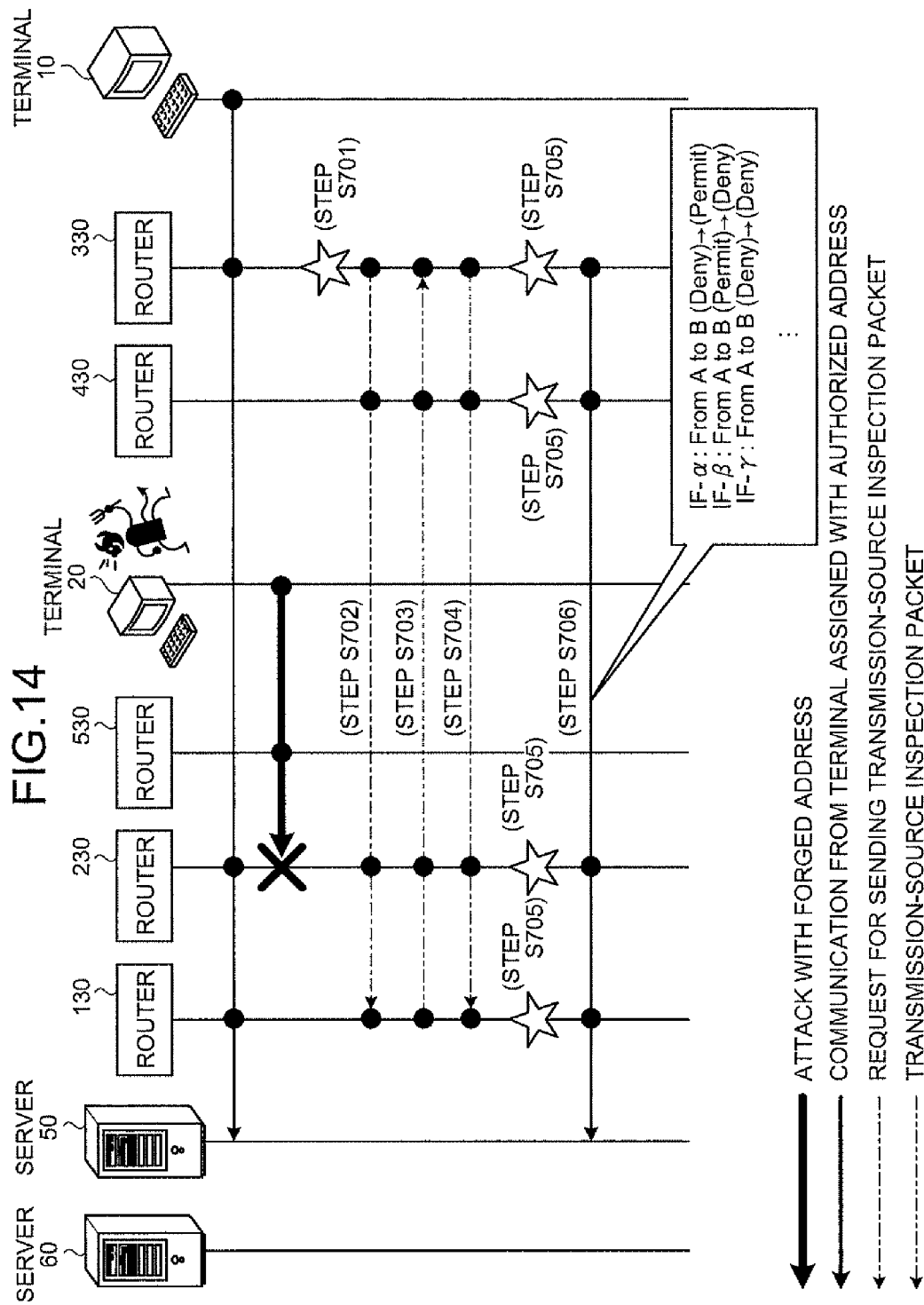
FIG. 14 is a schematic diagram for explaining a process performed by the network system according to the third embodiment.

A process performed by the network system from a change of the route to completion of an update of a setting of the filter table is described below. FIG. 14 is a schematic diagram for explaining a process performed by the network system according to the third embodiment. When disconnection occurs between the routers 230 and 330, the router 330 changes an address directed to the server 50 (i.e., directed to the IP address B) or the like via the router 230 to an address directed to the same via the router 430 (Step S701).

The router 330 then determines whether there is an entry whose destination IP address field in the filter table contains an IP address related to the change of the route. It is assumed that the router 330 has entries as illustrated in FIG. 15 with regard to the IP address B.

The router 330 transmits the send request packet based on the transmission-source IP address A and the destination IP address B of an entry illustrated in FIG. 15 (Step S702). A message type of the send request packet contains "3", A is set as a transmission-source IP address of the send request packet, and B is set as a destination IP address of the send request packet.

After receiving the send request packet, the router 130 that accommodates the server 50 transmits the transmission-source inspection packet (for request) in which the destination IP address and the transmission-source IP address of the received send request packet are replaced with each other (Step S703). A message type of the transmission-source inspection packet (for request) contains "0", B is set as a transmission-source IP address of the transmission-source inspection packet (for request), and A is set as a destination IP address of the transmission-source inspection packet (for request).

The router 330, which has received the transmission-source inspection packet (for request) and accommodates the terminal 10, transmits the transmission-source inspection packet (for response) to the router 130 (Step S704). A message type of the transmission-source inspection packet (for response) contains "1", A is set as a transmission-source IP address of the transmission-source inspection packet (for response), and B is set as a destination IP address of the transmission-source inspection packet (for response).

Then, each of the routers 430, 230, and 130 re-sets a filter table so as to permit transmission of only a packet that contains the transmission-source IP address A and the destination IP address B and is received through the interface that has received the transmission-source inspection packet (for response) and so as to discard others (Step S705).

The router 330 that is located on a path of the transmission-source inspection packet also re-sets a filter so as to permit transmission of only a packet that contains the transmission-source IP address A and the destination IP address B and is received through an IF-δ, although not illustrated in FIG. 14.

The router 230 relays a packet that is transmitted from the terminal 10 to the server 50 and received through the IF-α according to the filter table set at Step S705 (Step S706). Thereafter, processes at Steps S703 to S706 are repeated at regular intervals to refresh entries in the filter table.

Figure 16:
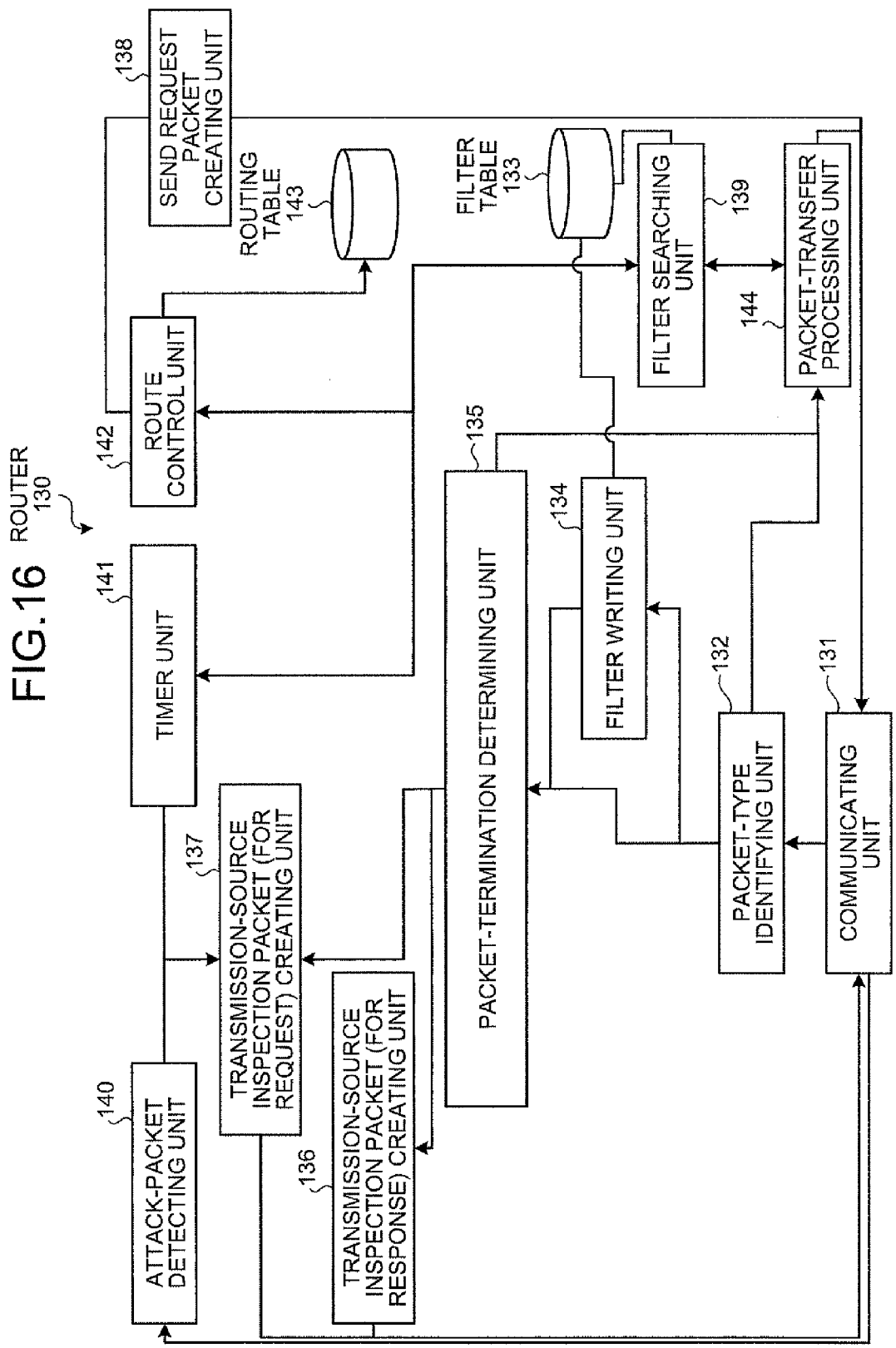
FIG. 16 is a functional block diagram of a configuration of a router according to the third embodiment.

A configuration of the router according to the third embodiment is described below. A configuration of each of the routers 230 to 530 is the same as the router 130, and therefore, explanation thereof will be omitted. FIG. 16 is a functional block diagram of a configuration of the router 130 according to the third embodiment. As illustrated in FIG. 16, the router 130 includes a communicating unit 131, a packet-type identifying unit 132, a filter table 133, a filter writing unit 134, a packet-termination determining unit 135, a transmission-source inspection packet (for response) creating unit 136, a transmission-source inspection packet (for request) creating unit 137, a send request packet creating unit 138, a filter searching unit 139, an attack-packet detecting unit 140, a timer unit 141, a route control unit 142, a routing table 143, and a packet-transfer processing unit 144.

The communicating unit 131 performs processing for receiving a packet from a network and transmitting a packet to the network. The communicating unit 131 outputs a received packet to the packet-type identifying unit 132 and the attack-packet detecting unit 140.

The packet-type identifying unit 132 identifies a type of a packet based on the message type contained in the packet, and outputs the packet to one of the filter writing unit 134, the packet-termination determining unit 135, and the packet-transfer processing unit 144 based on an identification result.

The packet-type identifying unit 132 outputs a packet to the packet-termination determining unit 135 when the packet is identified as the transmission-source inspection packet (for request) (i.e., when "0" is contained in the message type) or when the packet is identified as the send request packet (i.e., when "2" is contained in the message type).

The packet-type identifying unit 132 outputs a packet to the filter writing unit 134 when the packet is identified as the transmission-source inspection packet (for response) (i.e., when "1" is contained in the message type). The packet-type identifying unit 132 outputs other packets to the packet-transfer processing unit 144.

The filter table 133 is a table for storing information for determining whether to discard a packet. A data structure of the filter table 133 is the same as the data structure of the filter table as illustrated in FIGS. 6 and 15, and therefore, explanation thereof will be omitted.

The filter writing unit 134 creates an entry for the filter table 133 based on a transmission-source IP address, a destination IP address, and the number of a receive interface that are contained in the transmission-source inspection packet (for response). The filter writing unit 134 sets "Permit" only to a processing field corresponding to a receive interface for the transmission-source inspection packet (for response) in the filter table, sets "Deny" to processing fields corresponding to other interfaces, and registers a current time in a time field. When the same entry is contained in the filter table 133, the filter writing unit 134 updates a current time.

The packet-termination determining unit 135 determines whether to terminate or relay the transmission-source inspection packet (for request or for response) and the send request packet. More specifically, when a destination IP address of each of the transmission-source inspection packet (for request or for response) and the send request packet is in a subnet of own router, the packet-termination determining unit 135 terminates each of the transmission-source inspection packet (for request or for response) and the send request packet and passes processing to either the transmission-source inspection packet (for request) creating unit 137 or the transmission-source inspection packet (for response) creating unit 136. It is assumed here that the packet-termination determining unit 135 holds an IP address of a terminal in the subnet of the own router, although not illustrated in FIG. 16.

The packet-termination determining unit 135 instructs the transmission-source inspection packet (for response) creating unit 136 to create the transmission-source inspection packet (for response) in which the destination IP address of the transmission-source inspection packet (for request) that has been terminated is set as a transmission-source IP address and the transmission-source IP address of the transmission-source inspection packet (for request) is set as a destination IP address.

The packet-termination determining unit 135 instructs the transmission-source inspection packet (for request) creating unit 137 to create the transmission-source inspection packet (for request) in which the destination IP address of the send request packet that has been terminated is set as a transmission-source IP address and the transmission-source IP address of the send request packet is set as a destination IP address.

The transmission-source inspection packet (for response) creating unit 136 creates the transmission-source inspection packet (for response) based on the instruction from the packet-termination determining unit 135 (see FIG. 3 for a format of the transmission-source inspection packet (for response)). The transmission-source inspection packet (for response) creating unit 136 outputs the created transmission-source inspection packet (for response) to the communicating unit 131 for transmission to the network.

The transmission-source inspection packet (for request) creating unit 137 creates the transmission-source inspection packet (for request) based on an instruction from the packet-termination determining unit 135, the attack-packet detecting unit 140, and the timer unit 141 (see FIG. 3 for a format of the transmission-source inspection packet (for request)). The transmission-source inspection packet (for request) creating unit 137 outputs the transmission-source inspection packet (for request) to the communicating unit 131 for transmission to the network.

The send request packet creating unit 138 creates the send request packet based on an instruction from the route control unit 142 (see FIG. 3 for a format of the send request packet). The send request packet creating unit 138 outputs the created send request packet to the communicating unit 131 for transmission to the network.

The filter searching unit 139 searches the filter table 133 based on a condition (a transmission-source IP address, a destination IP address, and an interface) output from the packet-transfer processing unit 144, and outputs a search result ("Permit" or "Deny") to the packet-transfer processing unit 144. The filter searching unit 139 outputs data in the filter table 133 to the timer unit 141 according to a request from the timer unit 141, and deletes an entry from the filter table 133 according to an instruction from the timer unit 141.

The attack-packet detecting unit 140 detects an attack packet. It is assumed that the attack-packet detecting unit 140 employs the same method for detecting the attack packet as that of the conventional technology. When detecting the attack packet, the attack-packet detecting unit 140 instructs the transmission-source inspection packet (for request) creating unit 137 to create the transmission-source inspection packet (for request) in which the transmission-source IP address of the attack packet is set as a destination IP address and the destination IP address of the attack packet is set as a transmission-source IP address.

The timer unit 141 retransmits the transmission-source inspection packet (for request) and deletes an entry that has been timed out from the filter table 133. A process for retransmitting the transmission-source inspection packet (for request) by the timer unit 141 is described below. Retransmission of the transmission-source inspection packet (for request) enables entries in the filter table 133 to be refreshed.

The timer unit 141 causes the filter searching unit 139 to search for an IP address that belongs to the subnet of the own router among transmission-source IP addresses in the filter table 133 at regular time intervals (t1). When a predetermined time has elapsed since a time set in the time field of the entry identified by a search, the timer unit 141 instructs the transmission-source inspection packet (for request) creating unit 137 to set a value in a transmission-source IP address field of corresponding entry information to a transmission-source IP address and set a value in a destination IP address field to a destination IP address.

A process for deleting an entry from the filter table 133 by the timer unit 141 is described below. The timer unit 141 causes the filter searching unit 139 to search for a time field in the filter table 133 and deletes an entry for which a predetermined time has elapsed at regular time intervals (t2: t2>t1) (the timer unit 141 requests the filter searching unit 139 to delete the entry).

The route control unit 142 has a function for determining, when detecting a change of a route, whether an IP address related to the change of the route is contained in a destination IP address field in the filter table 133 (check by using the filter searching unit 139) in addition to a so-called IP route control function. For example, when a route of a packet addressed to the destination IP address B include a route where disconnection occurs, the route control unit 142 determines whether the IP address B is contained in the destination IP address field in the filter table 133. It is assumed that a route for each destination IP address is registered in the routing table 143.

When a corresponding entry is present in the filter table 133, the route control unit 142 instructs the send request packet creating unit 138 to create the send request packet in which a value in a transmission-source IP address field of corresponding entry information is set as a transmission-source IP address and a value in a destination IP address field of the corresponding entry information is set as a destination IP address.

The route control unit 142 controls a route of a packet. The routing table 143 is a table for storing information about a route to be used for relaying a packet.

The packet-transfer processing unit 144 performs existing processing for transferring a packet and discarding a packet in which a transmission-source IP address is manipulated. The packet-transfer processing unit 144 causes the filter searching unit 139 to search the filter table 133 for an entry corresponding to a transmission-source IP address, a destination IP address, and a receive interface of each received packet. When such an entry is present and a processing field of this entry contains "Deny", the packet-transfer processing unit 144 discards a corresponding received packet.

On the other hand, when such an entry is not present or the processing field of the corresponding packet contains "Permit", the packet-transfer processing unit 144 transfers the corresponding received packet.

A procedure of each process performed by the router according to the third embodiment is described below. More specifically, a process performed when the router determines whether to change a route (processes corresponding to Steps S701 and S702 of FIG. 14) and a process performed when the router acquires the send request packet (a process corresponding to Step S703 of FIG. 14) are described below. The processes at Steps S704 and S705 of FIG. 14 are the same as the processes of FIGS. 8 and 9, and therefore, explanation thereof will be omitted.

Figure 17:
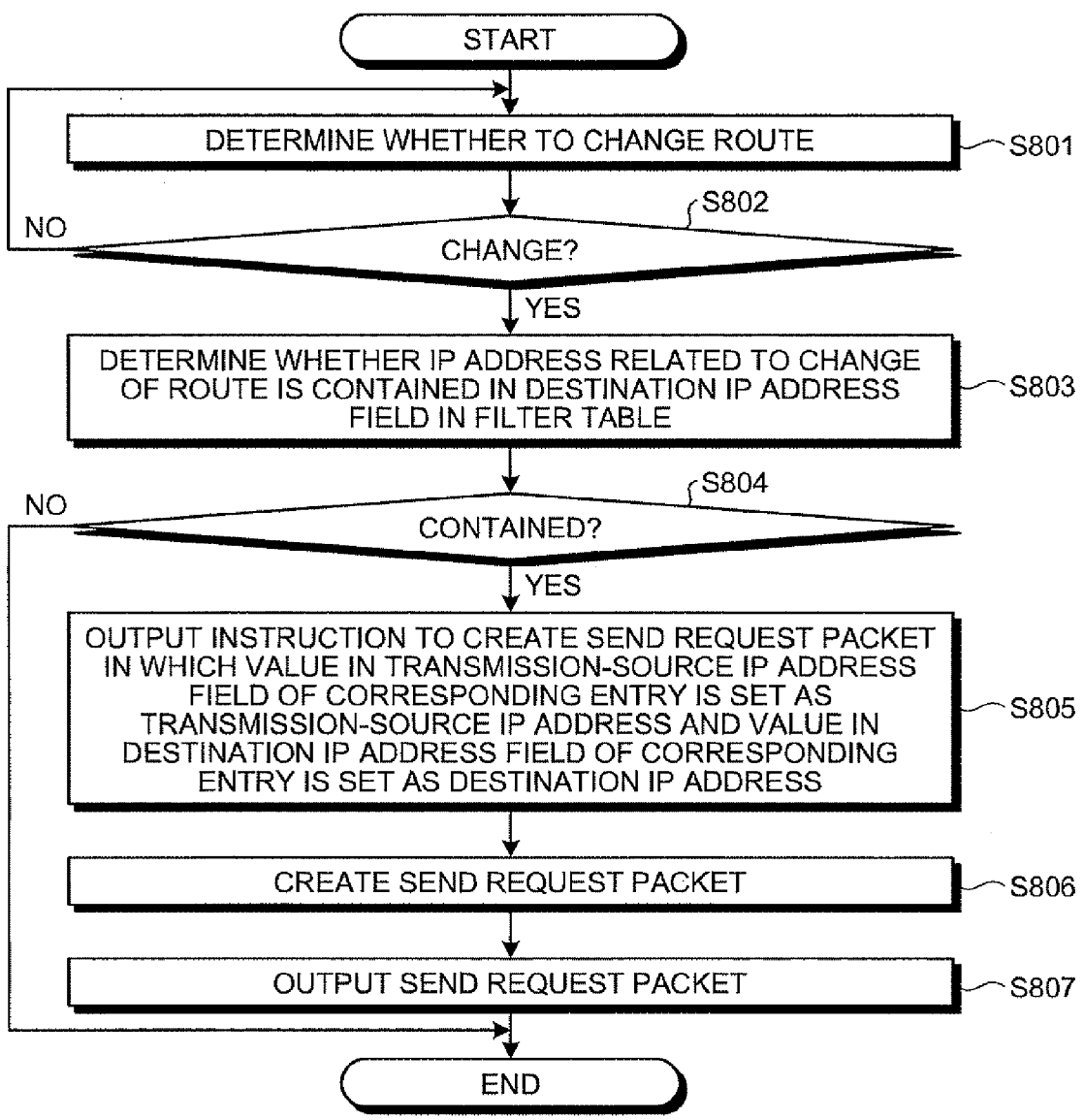
FIG. 17 is a flowchart of a process performed when the router of the third embodiment determines whether to change a route.

A process performed when the router determines whether to change a route is described below. FIG. 17 is a flowchart of the process performed when the router of the third embodiment determines whether to change a route. As illustrated in FIG. 17, the route control unit 142 determines whether to change a route (Step S801). When the route is not changed (NO at Step S802), the process proceeds to Step S801.

On the other hand, when the route is changed (when disconnection or the like is detected) (YES at Step S802), the route control unit 142 determines whether an IP address related to the change of the route is contained in the destination IP address field in the filter table 133 (Step S803). When the IP address is not contained (NO at Step S804), the process ends.

When the IP address related to the change of the route is contained in the destination IP address field in the filter table 133 (YES at Step S804), the route control unit 142 outputs to the send request packet creating unit 138 an instruction to create the send request packet in which a value in the transmission-source IP address field of a corresponding entry is set as a transmission-source IP address and a value in a destination IP address field is set as a destination IP address (Step S805).

The send request packet creating unit 138 creates the send request packet (Step S806), and outputs the created send request packet to the communicating unit 131 for transmission to the network (Step S807).

Figure 18:
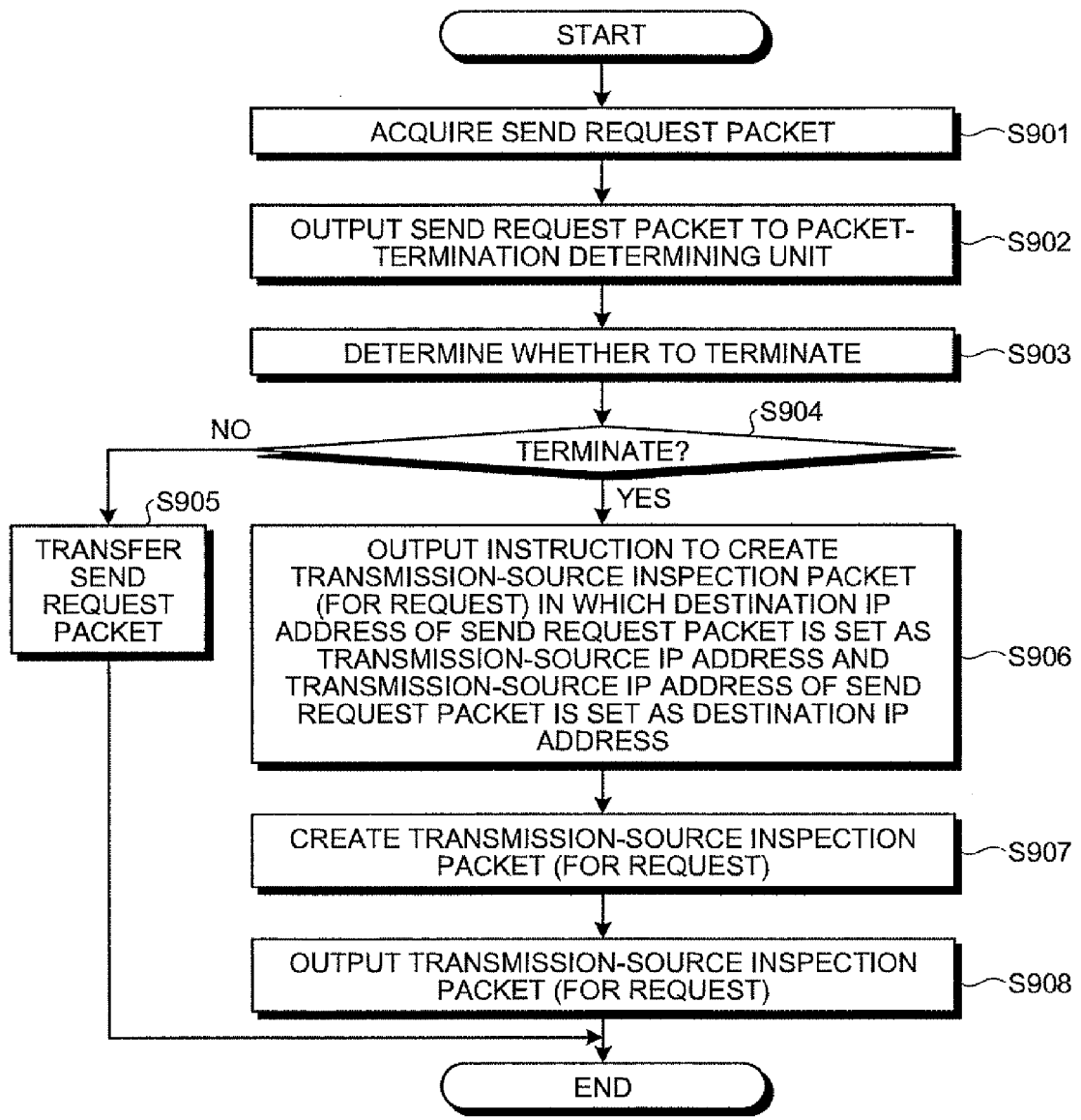
FIG. 18 is a flowchart of a process performed when the router of the third embodiment acquires a send request packet.
Figure 19:
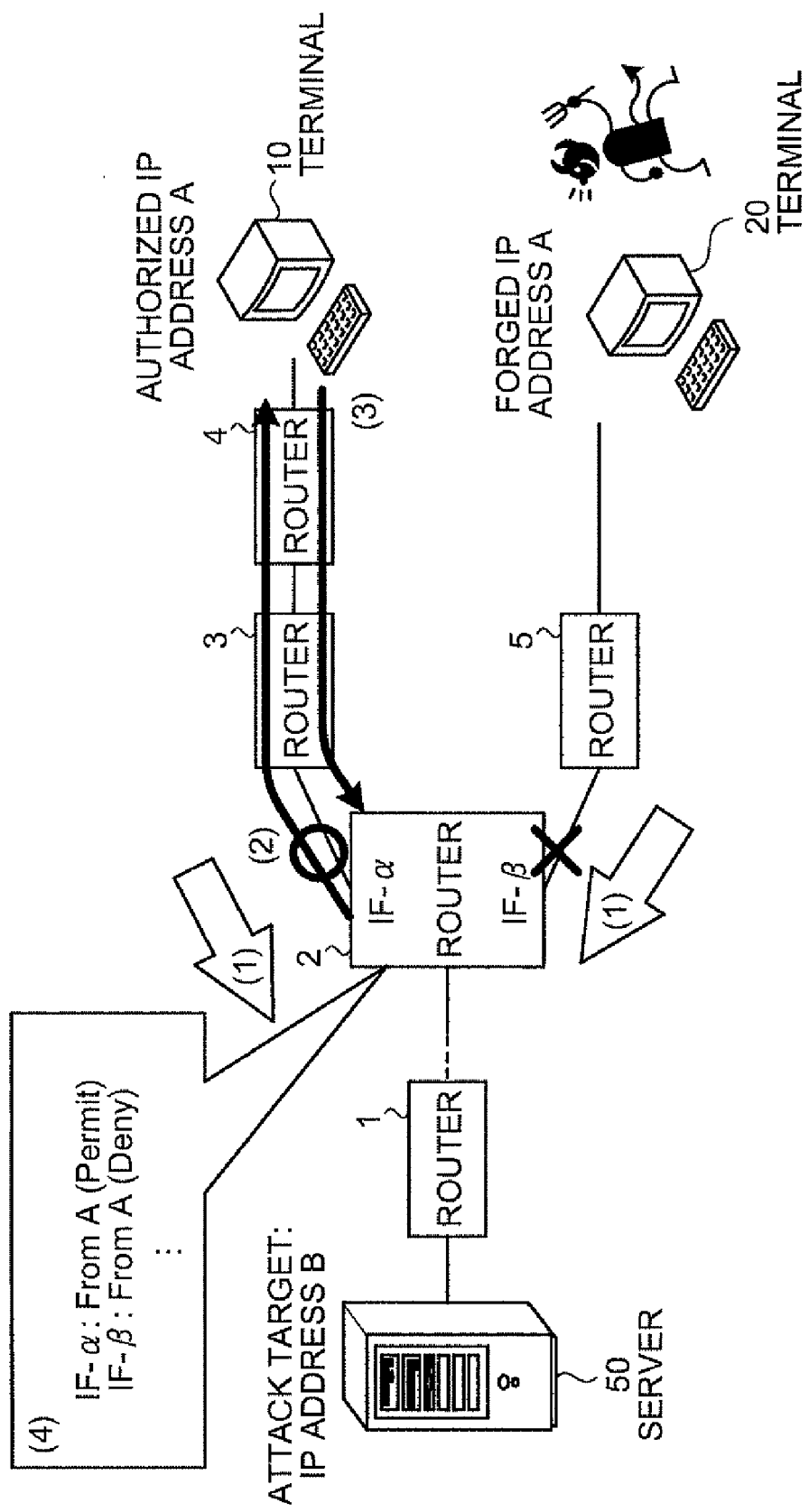
FIG. 19 is a schematic diagram for explaining a conventional technology.

A process performed when the router acquires the send request packet is described below. FIG. 18 is a flowchart of a process performed when the router of the third embodiment acquires the send request packet. As illustrated in FIG. 18, the packet-type identifying unit 132 acquires the send request packet from the communicating unit 131 (Step S901), and outputs the send request packet to the packet-termination determining unit 135 (Step S902).

The packet-termination determining unit 135 determines whether to terminate the send request packet (Step S903). When the send request packet is determined not to be terminated (NO at Step S904), the packet-termination determining unit 135 transfers the send request packet (Step S905).

On the other hand, when the send request packet is determined to be terminated (YES at Step S904), the packet-termination determining unit 135 outputs an instruction to create the transmission-source inspection packet (for request) in which the destination IP address of the send request packet is set as a transmission-source IP address and the transmission-source IP address of the send request packet is set as a destination IP address (Step S906).

The transmission-source inspection packet (for request) creating unit 137 creates the transmission-source inspection packet (for request) (Step S907), and outputs the created transmission-source inspection packet (for request) to the communicating unit 131 for transmission to the network (Step S908).

In the above-mentioned flowcharts of FIGS. 17 to 18, each process is described with reference to the functional block diagram of FIG. 16 (i.e., each processing unit of the router 130). However, functional units of each of the routers 230 to 530 also perform the same processes as those of the router 130.

As described above, in the network system according to the third embodiment, each of the routers 130 to 530 outputs, when changing a route for transferring a packet over the network, a packet for requesting an output of the transmission-source inspection packet (for request) (i.e., the send request packet) to other relay devices that are connected to a new route, and causes a relay device that has received the send request packet to output the transmission-source inspection packet (for request) so that the filter table can be updated. Therefore, it is possible to discard an attack packet containing a forged transmission-source IP address in coordination with a route control protocol.

Of the various processing explained in the description of the exemplary embodiments, it is acceptable to manually perform a part or all of the processing that is explained to be performed automatically. Conversely, it is acceptable to automatically perform, using a commonly-known technique, a part or all of the processing that is explained to be performed manually. In addition, the processing procedures, the control procedures, the specific names, and the information including various types of data and parameters that are presented in the text and the drawings can be modified in any form, except when it is noted otherwise.

The constituent elements of the routers 100, 130, and the like illustrated in FIGS. 5, 16, and the like are based on functional concepts. The constituent elements do not necessarily have to be physically arranged in the way illustrated in the drawings. In other words, the specific mode in which the constituent elements are distributed and integrated is not limited to the ones illustrated in the drawing. A part or all of the routers can be distributed or integrated, either functionally or physically in any arbitrary units according to various loads and use condition. A part or all of the processing functions offered by the constituent elements can be realized by a central processing unit (CPU) and a computer program analyzed and executed by the CPU, or may be realized as hardware with wired logic.

According to an embodiment, only an attack packet can be accurately discarded. Furthermore, an entry in a filter table can be appropriately set even when an authorized terminal as a destination of an inspection packet is being shut down.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for relaying packets transferred over a network and discarding an attack packet detected among the packets, the apparatus comprising:
   an inspection-packet outputting unit that outputs, when detecting the attack packet, an inspection packet in which a transmission-source address contained in the attack packet is set as a destination address and a destination address contained in the attack packet is set as a transmission-source address;
   a filter table storing unit that stores, when acquiring a response packet for the inspection packet, a transmission-source address, a destination address, and identification information of an interface, which has received the response packet, that are contained in the response packet, in a filter table in an associated manner;
   a transfer control unit that determines whether to transfer a packet as a transfer object based on the filter table;
   a route-change determining unit that determines whether to change a route on the network where the packet is transferred; and
   a request-packet outputting unit that outputs a request packet for requestinq an output of the inspection packet based on a result of determination by the route-change determining unit.

2. The apparatus according to claim 1, further comprising a proxy responding unit that acquires the inspection packet and outputs, when a terminal device assigned with an address corresponding to a destination address of the inspection packet is connected to a subnet of the apparatus, a response packet for the inspection packet on behalf of the terminal device.

3. The apparatus according to claim 2, wherein when acquiring the request packet, the inspection-packet outputting unit outputs the inspection packet.

4. A method of relaying packets transferred over a network and discarding an attack packet detected among the packets, the method comprising:

outputting, when detecting the attack packet, an inspection packet in which a transmission-source address contained in the attack packet is set as a destination address and a destination address contained in the attack packet is set as a transmission-source address;

storing, when acquiring a response packet for the inspection packet, a transmission-source address, a destination address, and identification information of an interface, which has received the response packet, that are contained in the response packet, in a filter table in an associated manner;

determining whether to transfer a packet as a transfer object based on the filter table;

further determining whether to change a route on the network where the packet is transferred; and further outputting a request packet for requesting an output of the inspection packet based on a result of determination in the further determining.

5. The method according to claim 4, further comprising acquiring the inspection packet and outputting, when a terminal device assigned with an address corresponding to a destination address of the inspection packet is connected to own subnet, a response packet for the inspection packet on behalf of the terminal device.

6. The method according to claim 5, wherein the outputting includes outputting the inspection packet when acquiring the request packet.

* * * * *